(12) United States Patent
Kure

(10) Patent No.: US 8,890,453 B2
(45) Date of Patent: Nov. 18, 2014

(54) POWER CONVERSION APPARATUS

(75) Inventor: Kenji Kure, Obu (JP)

(73) Assignee: DENSO CORPORATION, Kariya (JP)

( * ) Notice: Subject to any disclaimer, the term of this patent is extended or adjusted under 35 U.S.C. 154(b) by 285 days.

(21) Appl. No.: 13/592,661

(22) Filed: Aug. 23, 2012

(65) Prior Publication Data

US 2013/0049654 A1 Feb. 28, 2013

(30) Foreign Application Priority Data

Aug. 27, 2011 (JP) ................... 2011-185377
Jul. 9, 2012 (JP) ................... 2012-153804

(51) Int. Cl.

| H03K 5/00 | (2006.01) |
| H02P 6/00 | (2006.01) |
| G05F 3/04 | (2006.01) |
| H02H 7/122 | (2006.01) |
| B60L 3/00 | (2006.01) |
| H02M 3/337 | (2006.01) |
| B60L 15/00 | (2006.01) |
| B60L 11/18 | (2006.01) |
| H02M 1/34 | (2007.01) |

(52) U.S. Cl.
CPC ......... B60L 11/1803 (2013.01); B60L 2220/12 (2013.01); B60L 2210/10 (2013.01); H02M 2001/344 (2013.01); B60L 3/003 (2013.01); Y02T 10/7005 (2013.01); H02M 3/3376 (2013.01); Y02T 10/7216 (2013.01); B60L 15/007 (2013.01); B60L 2270/142 (2013.01)
USPC .................. 318/400.2; 318/400.01; 323/311; 363/56.01

(58) Field of Classification Search
USPC ......... 318/400.01, 400.2; 323/311; 363/56.01
See application file for complete search history.

(56) References Cited

U.S. PATENT DOCUMENTS

| 7,298,634 | B2 * | 11/2007 | Yasumura .................... 363/24 |
| 2005/0270715 | A1 * | 12/2005 | Yamamoto et al. ......... 361/91.7 |
| 2006/0268589 | A1 * | 11/2006 | Nakahori .................... 363/132 |
| 2007/0025125 | A1 * | 2/2007 | Nakahori et al. ......... 363/56.02 |
| 2007/0109822 | A1 * | 5/2007 | Kuan .......................... 363/21.14 |
| 2007/0115697 | A1 * | 5/2007 | Ando et al. .................... 363/16 |
| 2008/0130326 | A1 * | 6/2008 | Kuan .......................... 363/21.14 |
| 2009/0268489 | A1 * | 10/2009 | Lin et al. ...................... 363/50 |

FOREIGN PATENT DOCUMENTS

| JP | A-02-168858 | 6/1990 |
| JP | 06-113534 A | 4/1994 |
| JP | A-2005-094946 | 4/2005 |
| JP | 2006-140088 A | 6/2006 |
| JP | A-2007-043797 | 2/2007 |
| JP | 2007-080700 A | 3/2007 |
| JP | A-2010-206109 | 9/2010 |

* cited by examiner

*Primary Examiner* — Paul Ip
*Assistant Examiner* — Gabriel Agared
(74) *Attorney, Agent, or Firm* — Posz Law Group, PLC

(57) ABSTRACT

In a power conversion apparatus, a main switching element in one main circuit is controlled to repeat an on-off state, and a diode in the other main circuit is used as a freewheeling diode. Multiple snubber circuits each having a resistor, a capacitor, and a second switching element which are serially coupled are coupled in parallel to the main circuit. The second switching elements are turned-on sequentially before the turn-on or turn-off of the main switching element that repeats the on-off state.

17 Claims, 16 Drawing Sheets

RESONANCE ANGULAR
FREQUENCY GAP   $\Delta\omega = \omega_2 - \omega_3$ $\omega_2 = \dfrac{1}{\sqrt{L_p C_1}}$ $\omega_3 = \dfrac{1}{\sqrt{L_p (C_1 + C_2)}}$

···EXPRESSION 5

$10 \log \left[ \dfrac{\sqrt{R_1^2 + \left(\omega L - \dfrac{1}{\omega C_1}\right)^2}}{R_1} A_2 + \dfrac{\sqrt{R_2^2 + \left(\omega L - \dfrac{1}{\omega(C_1 + C_2)}\right)^2}}{R_2} A_3 \right]$ [dBm]   ···EXPRESSION 6

POWER CONVERSION APPARATUS

CROSS REFERENCE TO RELATED APPLICATIONS

The present application is based on and claims priority to Japanese Patent Application No. 2011-185377 filed on Aug. 27, 2011 and No. 2012-153804 filed on Jul. 9, 2012, the contents of which are incorporated in their entirety herein by reference.

TECHNICAL FIELD

The present disclosure relates to a power conversion apparatus for a direct current power supply with switching elements.

BACKGROUND

As a power conversion apparatus for a direct current power supply with switching elements such as a power metal oxide semiconductor field effect transistor (power MOSFET), there are, for example, an inverter that converts direct current into alternating current and a DC-DC converter.

FIG. 17A shows a half bridge circuit used as a basis for one phase of an inverter. FIG. 17B is a time chart to explain operation of a power conversion apparatus 90 shown in FIG. 17A and shows an enlarged view of rise characteristics of a current Id and a voltage V2 when a switching element SW1 is turned ON.

The power conversion apparatus 90 surrounded by a dash-dot line shown in FIG. 17A is provided with the switching element SW1 on the high side and a switching element SW2 on the low side. By complementarily operating the switching element SW1 on the high side and the switching element SW2 on the low side, a direct current voltage E is converted to an alternating voltage, and power is supplied to an inductive load L.

A power MOSFET, an insulated gate bipolar transistor (IGBT), a super-junction (SJ) MOSFET, etc. are used for the switching elements SW1 and SW2 in FIG. 17A. Diodes D1 and D2 are respectively coupled in anti-parallel to the switching elements SW1 and SW2, and operated as freewheeling diodes when the inductive load L is driven. On the other hand, reverse recovery characteristics of the diodes D1 and D2 are generally poor. Therefore, as shown in FIG. 17B, a large spiked surge current due to a reverse recovery current (a current that flows in the opposite direction of the diode at the time of the reverse recovery) is generated on the current Id when the switching element SW1 is turned ON. Additionally, a surge voltage and a circuit resonance called ringing are induced to the voltage V2.

This phenomenon will be described as follows. In the half bridge circuit of FIG. 17A, during a dead time when the switching element SW1 on the high side and the switching element SW2 on the low side are turned OFF simultaneously, a circulating current in the forward direction flows from the inductive load L to the diode D2 on the low side. In this state, when the switching element SW1 on the high side is turned ON, the load current switches to the current Id that flows through the switching element SW1. At this time, a voltage in the opposite direction is applied to the diode D2, and as shown by waveforms of the current Id and voltage V2 in FIG. 17B, a large reverse recovery current is superimposed to generate a current surge and a voltage surge. Further, even after minority carriers, which are main ingredients of excess carriers injected from a P-region inside the diode D2, disappear and the diode D2 is turned OFF, the ringing shown in FIG. 17B is generated to cause noise. This ringing is caused by an LC circuit resonance generated by a parasitic inductance Lp of a wiring pattern and wire harness shown by a dashed line in FIG. 17A and a device capacitance Cd between the drain and the source of the switching element SW2.

Conventional power conversion apparatuses for a direct current power supply with switching elements have used a snubber circuit to suppress a spiked surge current generated at the time of ON/OFF of the above switching elements and the ringing associated therewith. A power conversion apparatus provided with the snubber circuit is disclosed, for example, in JP-A-2007-43797 (Patent Document 1) and JP-A-2010-206109 (Patent Document 2).

FIG. 18 is a circuit diagram of a power conversion apparatus 91 in which an RC snubber N is added to the power conversion apparatus 90 of FIG. 17A.

In the power conversion apparatus 91 shown in FIG. 18, the RC snubber N surrounded by a dash-dot-dot line and including a resistor R and a capacitor C, which are serially coupled, is coupled in parallel to the switching element SW2. The RC snubber N is the most generally used snubber circuit conventionally, in which the resistor R and capacitor C are added to reduce a value Q ($Q=(1/R)\cdot\sqrt{(L/C)}$) of the series resonance and to increase the attenuation and to suppress the ringing (circuit resonance).

FIG. 19 is a diagram showing noise spectrums of the current Id of the above power conversion apparatus 90 (without the RC snubber N) and power conversion apparatus 91 (with the RC snubber N) to schematically show relationship between the frequencies and amplitudes, in which the ringing (circuit resonance) of each current Id shown in FIG. 17B is treated with Fourier-transformation.

As shown in FIG. 19, with the RC snubber N, an amplitude peak (resonance peak) of the ringing (circuit resonance) shifts toward lower frequencies from a resonance frequency f1 to a resonance frequency fn, and a maximum amplitude (peak value) is suppressed.

To sufficiently suppress the ringing (circuit resonance) in the power conversion apparatus 91 of FIG. 18, a capacitance value needed for the capacitor C of the RC snubber N is about 4 to 10 times of a capacitance value of the device capacitance Cd. Thus, for example in a semiconductor power module described in Patent Document 1, a multilayer ceramic capacitor is generally attached externally to a semiconductor chip to form the RC snubber. However, it is desirable to form the RC snubber on a semiconductor chip for size reduction.

On the other hand, in the power conversion apparatus of Patent Document 2, a freewheeling diode in which unipolar operation is carried out with a small reverse recovery current is used, a capacitor of the RC snubber is formed in a different position from a region in a semiconductor substrate in which a depletion layer is formed by the freewheeling diode, and a convergence time of an oscillation of a current and voltage generated at the time of reverse recovery operation of the freewheeling diode is reduced.

The power conversion apparatus of Patent Document 2 is reduced in size by forming the RC snubber on the semiconductor chip, but needs a Schottky barrier diode and a diode such as a soft recovery diode that carries out specific unipolar operation to control lifetimes of minor carriers. These diodes are different from a general PN junction diode. Additionally, by using the diode that carries out unipolar operation, a capacitance value of the capacitor of the RC snubber is small to some degree. Realistically, a capacitance value of the capacitor that can be actually formed on the semiconductor chip is limited to about one time of the device capacitance Cd. This capacitance value is insufficient to suppress noise.

When the spiked surge current and the ringing associated therewith shown in FIG. 17B and FIG. 19 are suppressed insufficiently, the spiked surge current and ringing variously affect devices around the power conversion apparatus as noise related to electromagnetic compatibility (EMC). Particularly, the spiked surge current and ringing greatly affect external devices which are coupled to the ground (GND) common to the power conversion apparatus and which share the GND wiring with the power conversion apparatus.

SUMMARY

It is desirable to provide a power conversion apparatus for a direct current power supply with switching elements, particularly a power conversion apparatus that sufficiently reduces noise associated with ringing.

A power conversion apparatus according to an aspect of the present disclosure includes two serially coupled main circuits coupled to a direct current power supply and a plurality snubber circuits coupled in parallel to at least one of the main circuits. Power is supplied to an inductive load from a connection point of the two main circuits. Each of the two main circuits has a main switching element and a diode coupled in anti-parallel between both ends of the main switching element. The main switching element of one of the two main circuits is controlled to repeat an on-off state in a predetermined period. A dead time when the main switching elements of the two main circuits are both in an off-state is provided. The diode in the other main circuit is used as a freewheeling diode in the dead time. Each of the plurality of snubber circuits has a resistor, a capacitor, and a second switching element that are serially coupled. Before the turn-on or turn-off of the main switching element that repeats the on-off state, the second switching elements in the plurality of snubber circuits repeat the turn-on and turn-off in a period of an integral multiple of the above predetermined period to produce different combinations of the on-states one after another. A series of resonance frequencies of each resonance circuit formed of device capacitances of the main switching element and the diode, a parasitic inductance of a wiring coupled to the direct current power supply, and the capacitor coupled based on the on-states of the second switching elements are different from each other.

BRIEF DESCRIPTION OF THE DRAWINGS

Additional objects and advantages of the present disclosure will be more readily apparent from the following detailed description when taken together with the accompanying drawings. In the drawings:

FIG. 15B is a diagram showing a load current path before a main switching element on the high side in U phase is turned ON, and FIG. 15C is a diagram showing a load current path and a resonance current path immediately after the main switching element is turned ON;

DETAILED DESCRIPTION

Hereafter, an embodiment of the present disclosure will be described in reference to the accompanying drawings.

Figure 1:
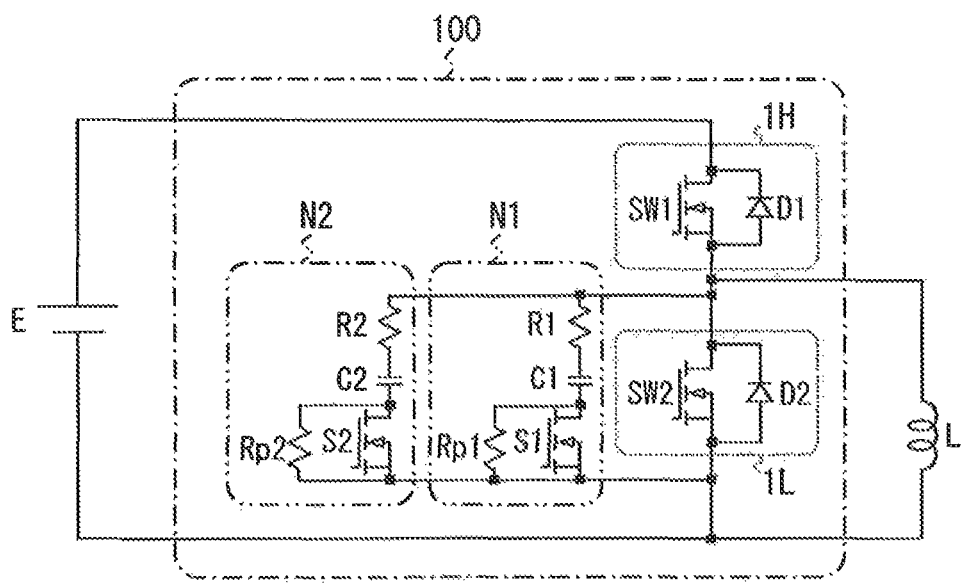
FIG. 1 is a circuit diagram showing one example of a power conversion apparatus of an embodiment of the present disclosure.
Figure 2A:
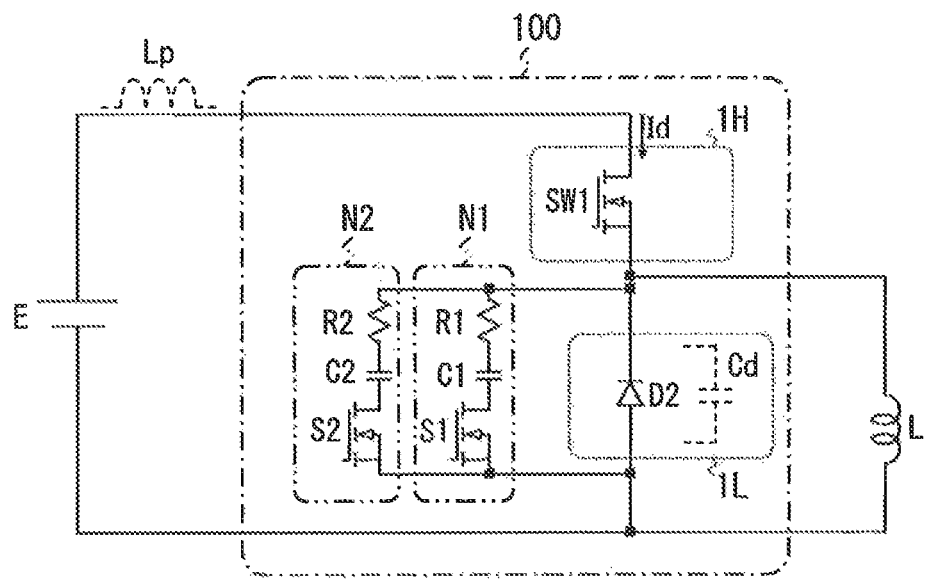
FIG. 2A is a circuit diagram to explain basic operation of the power conversion apparatus shown in FIG. 1.
Figure 2B:
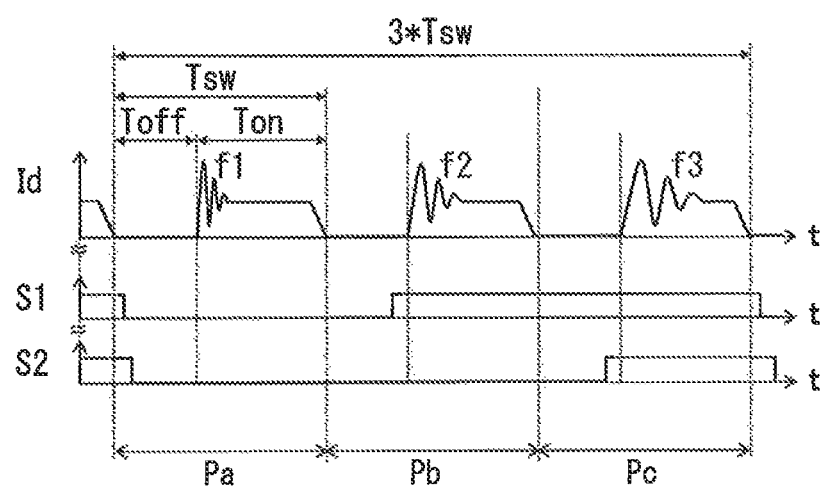
FIG. 2B is a time chart for three cycles of a main switching element in the power conversion apparatus of FIG. 2A.

FIG. 1 is a circuit diagram of an example of a power conversion apparatus 100 of an embodiment of the present disclosure. FIG. 2A is a circuit diagram to explain basic operation of the power conversion apparatus 100. In FIG. 2A, parasitic elements required for explanation of the basic operation of the power conversion apparatus 100 are shown by dashed lines. FIG. 2B is a time chart for 3 cycles (period 3*Tsw) of a main switching element SW1 that repeats an on-off state in a period Tsw in the power conversion apparatus 100 of FIG. 2A. Specifically, FIG. 2B is a diagram showing a current Id that flows through the main switching element SW1 on the high side, a timing of on-off of a second switching element S1 of a snubber circuit N1, and a timing of on-off of a second switching element S2 of a snubber circuit N2.

FIG. 1 corresponds to a half bridge circuit which is a basis for one phase of an inverter circuit. The power conversion apparatus 100 surrounded by a dash-dot line shown in FIG. 1 is provided with a main circuit 1H on the high side and a main circuit 1L on the low side, which are coupled to a direct current power supply E, which are surrounded by dotted lines, and which are serially coupled. The power conversion apparatus 100 converts electric power of the direct current power supply E, and supplies electric power to an inductive load L from connection points of the two main circuits 1H and 1L.

The main circuit 1H is provided with the main switching element SW1 and a diode D1 coupled in anti-parallel between both ends of the main switching element SW1. The main circuit 1L is provided with a main switching element SW2 and a diode D2 coupled in anti-parallel between both ends of the main switching element SW2. A power MOSFET, an IGBT, a SJ-MOSFET, etc. are used for the switching elements SW1 and SW2. The diodes D1 and D2 are preferably soft recovery diodes that perform operation equivalent to unipolar operation by controlling life times of minority carriers to decrease the after-mentioned reverse recovery charges and to thus reduce a surge current (reverse recovery current).

In the power conversion apparatus 100, as illustrated in FIG. 2B, the main switching element (SW1) of one main circuit (1H) of the two main circuits 1H and 1L is controlled to repeat the on-off state at a predetermined period (Tsw), and a dead time in which the main switching elements (SW1 and SW2) of the two main circuits (1H and 1L) are both in the off-state is provided. For example in FIG. 2B, the dead time is provided by about several microseconds at the beginning and end of a period Toff in which the other main switching element on the low side enters the on-state to prevent a short circuit between the other main switching element on the low side and the main switching element (SW1). The diode (D2) in the other main circuit (10 is used as a freewheeling diode in the above dead time.

In the power conversion apparatus 100 shown in FIG. 1, the multiple (two) snubber circuits N1 and N2 are each surrounded by the dash-dot-dot line. The snubber circuit N1 has a resistor R1, a capacitor C1, and a second switching element S1 that are serially coupled. The snubber circuit N2 has a resistor R2, a capacitor C2, and a second switching element S2 that are serially coupled. The snubber circuits N1 and N2 are coupled in parallel to the main circuit 1L on the low side. For simple explanation, FIG. 1 shows an example of the power conversion apparatus 100 in which the snubber circuits N1 and N2 are coupled in parallel to only the main circuit 1L on the low side. The snubber circuits N1 and N2 may be coupled in parallel also to the main circuit 1H on the high side.

The power conversion apparatus 100 shown in FIG. 1 is applicable to an inverter that converts direct current power to alternating current power, a DC-DC converter, etc. As well as general power conversion apparatuses 90 and 91 shown in FIG. 17A and FIG. 18, the power conversion apparatus 100 has the main circuit 1H on the high side and the main circuit 1L on the low side that are coupled to the direct current power supply E and serially coupled. The main circuit 1H is provided with the main switching element SW1 and the diode D1 coupled in anti-parallel between both ends of the main switching element SW1. The main circuit 1L is provided with the main switching element SW2 and the diode D2 coupled in anti-parallel between both ends of the main switching element SW2. The main switching element of one of the main circuits is controlled to repeat the on-off state in a predetermined period and to then supply power to the load L.

Figure 17A:
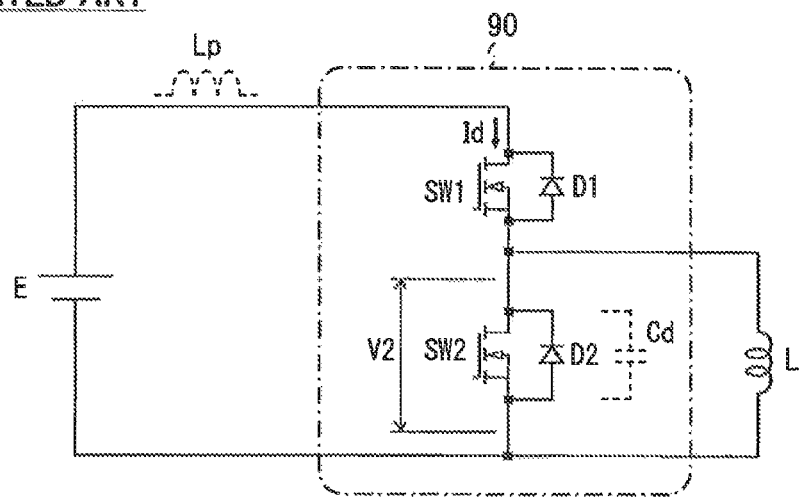
FIG. 17A is a circuit diagram showing an example of a conventional power conversion apparatus.
Figure 18:
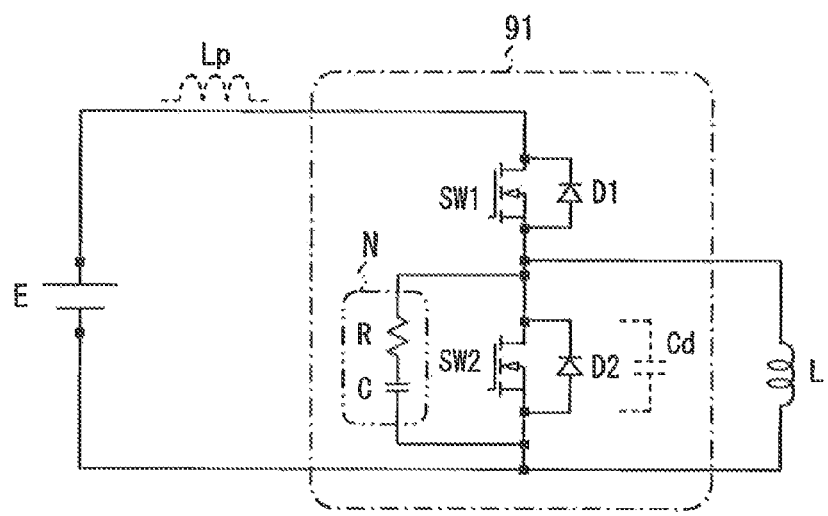
FIG. 18 is a circuit diagram showing a power conversion apparatus in which an RC snubber is added to the power conversion apparatus shown in FIG. 17A.

In the power conversion apparatus 100 of FIG. 1, the power conversion apparatus 90 of FIG. 17A, and the power conversion apparatus 91 of FIG. 18, the dead time in which the main switching element SW1 on the high side and the main switching element SW2 on the low side are both in the off-state is provided, as mentioned above. Then, the diode in the other main circuit is operated as the so-called freewheeling diode. That is, a load current is continued by making a current flow from the inductive load L in the forward direction of this diode during the dead time.

Figure 17B:
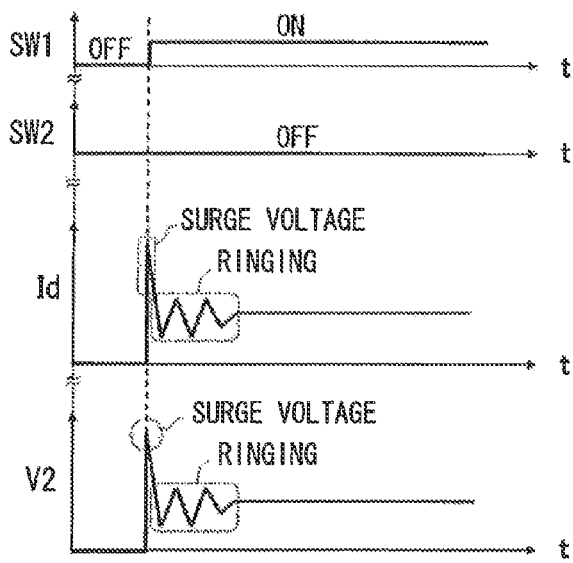
FIG. 17B is a time chart to explain operation of the power conversion apparatus shown in FIG. 17A.

On the other hand, a large current flows into and charges (reverse recovered charges) are injected into (stored in) the above diode functioning as the freewheeling diode during the dead time. When the main switching element that repeats the on-off state is turned on in this state, the load current is converted to the current flowing through this main switching element, and a voltage in the reverse direction is applied to the above freewheeling diode, through which a reverse recovery current due to the above reverse recovery charges flows. Accordingly, as explained in FIG. 17B, the reverse recovery current is superimposed on the current of the main switching element which has been turned on to generate a spiked current surge and voltage surge. A circuit resonance called ringing is induced to cause noise.

Conventionally, to suppress the above surge current (reverse recovery current) and the ringing associated therewith, snubber circuits are used, which are represented by an RC snubber N provided with one resistor R and one capacitor C that are serially coupled, as shown by the power conversion apparatus 91 of FIG. 18. However, to fully suppress the ringing (circuit resonance), the external capacitor C having a large capacitance value may be required, and thus the power conversion apparatus 91 has a large size. On the contrary, when the RC snubber N is formed on a semiconductor chip, the size reduction is possible. However, since only the capacitor C having a small capacitance value can be formed on the semiconductor chip, suppression of the ringing is insufficient and thus it is difficult to sufficiently reduce noise.

Then, to achieve both suppression of the ringing and size reduction, the power conversion apparatus 100 shown in FIG. 1 uses the circuitry in which the multiple (two) snubber circuits N1 and N2 are respectively provided with the resistor R1 and R2, the capacitors C1 and C2, and the second switching elements S1 and S2 respectively serially coupled, and coupled in parallel to the main circuit 1L on the low side. As illustrated in FIG. 2B, the multiple snubber circuits N1 and N2 are set to be driven such that different combinations of the on-states of the second switching elements S1 and S2 of the respective multiple (two) snubber circuits N1 and N2 are produced one after another before the turn-on of the main switching element SW1 that repeats the on-off state. That is, as shown in FIG. 2B, the second switching elements S1 and S2 repeat the turn-on and turn-off at the period 3*Tsw, which is three times of the period of the main switching element SW1. The repeat is as follows in sequence. The second switching elements S1 and S2 both enter the off-state (mainly in a period Pa), only the second switching element S1 enters the on-state (mainly in a period Pb), and the second switching elements S1 and S2 both enter the on-state (mainly in a period Pc). Thus, the second switching elements S1 and S2 form different combinations of the on-states one after another in the period 3*Tsw, which is three times of the period of the main switching element SW1. Accordingly, the multiple snubber circuits N1 and N2 are set to be driven such that a series of resonance frequencies f1 to f3 of each resonance circuit formed of the device capacitance Cd of the diode D2, the parasitic inductance Lp of the wiring coupled to the direct current power supply E, and the capacitors C1 and C2 coupled based on the on-states of the second switching elements S1 and S2 are different from each other.

In the power conversion apparatus of the present disclosure, the second switching elements in the multiple snubber circuits coupled in parallel to the main circuit repeat the turn-on and turn-off in a period of an integral multiple of the period of the main switching element to form different combinations of the on-states one after another before the turn-on or turn-off of the main switching element that repeats the on-off state. Accordingly, the series of resonance frequencies of each resonance circuit formed of the device capacitance of the diode, the parasitic inductance of the wiring coupled to the direct current power, and the capacitor coupled based on the on-state of the second switching elements are different from each other.

In the power conversion apparatus 100 of FIG. 1, unlike in the case in which only one conventional RC snubber N having no second switching element is coupled in parallel to the main circuit in the power conversion apparatus 91 shown in FIG. 18, a resonance peak of ringing can be dispersed by the number (+1) of the snubber circuits N1 and N2 coupled in parallel to the main circuit 1L. In general, the resonance peak can be dispersed by the number of different capacitance values of capacitors coupled in parallel. The capacitance values differ based on combinations of the on-states of the second switching elements.

The dispersion of the resonance peak of the ringing by the above multiple snubber circuits use the fact that a resonance frequency in circuit resonance is mainly determined by an LC constant of a circuit. In the power conversion apparatus 100 of FIG. 1, the snubber circuits N1 and N2 are switched such that a constant C changes in each switching of the main switching element SW1 to disperse the resonance peak of the ringing (noise) to three frequency components and thus to reduce the resonance peak.

Operation of the circuit of the above power conversion apparatus 100 is explained with reference to FIG. 2A and FIG. 2B.

To apply a controlled electric power to the load L, the main switching element SW1 on the high side repeats on/ff in the period Tsw, as shown in FIG. 2B. The circuit resonance occurs in timings of the turn-on and turn-off of the main switching element SW1 to cause the ringing noise. The multiple (two) snubber circuits N1 and N2 coupled in parallel to the main circuit 1L on the low side shown in FIG. 2A are configured to reduce the switching noise at the time of the turn-on. Multiple snubber circuits (not shown in FIG. 2A) coupled in parallel to the main circuit 1H on the high side are used to reduce the switching noise at the time of the turn-off.

In the power conversion apparatus 90 shown in FIG. 17A having no RC snubber N, a circuit resonance at the turn-on is generated between the parasitic inductance Lp of a wiring pattern etc. and the device capacitance Cd on the low side. Therefore, since the second switching elements S1 and S2 of the power conversion apparatus 100 are both in the off-states in the period Pa when the second switching elements S1 and S2 are operated as shown FIG. 2B, the frequency f1 of the circuit resonance is expressed by Expression 1 using the parasitic inductance Lp and device capacitance Cd.

$$f_1 = \frac{1}{2\pi}\sqrt{\frac{1}{L_p \times C_d}} \quad \text{[Expression 1]}$$

For example, when the device capacitance Cd is 300 pF and the parasitic inductance Lp of the wiring coupled to the direct current power supply E is 30 nH, f1 is 53.1 MHz.

Next, since only the second switching element S1 is in the on-state in the period Pb, the frequency f2 of the circuit resonance is expressed by Expression 2.

$$f_2 = \frac{1}{2\pi}\sqrt{\frac{1}{L_p \times (C_d + C_1)}} \quad \text{[Expression 2]}$$

For example, when a capacitance of the capacitor C1 is 20 pF, f2 is 51.4 MHz.

Since the second switching elements S1 and S2 are both in the on-state in the period Pc, the frequency f3 of the circuit resonance is expressed by Expression 3.

$$f_3 = \frac{1}{2\pi}\sqrt{\frac{1}{L_p \times (C_d + C_1 + C_2)}} \quad \text{[Expression 3]}$$

For example, when a capacitance of the capacitor C2 is 20 pF that is the same as that of the capacitor C1, f3 is 49.9 MHz.

The ringing noise superimposed on the waveform of the current Id is dispersed to the three resonance frequencies f1, f2, and f3 in accordance with different combinations of the on-states of the second switching elements S1 and S2, as shown in FIG. 2B.

In the power conversion apparatus 100 of FIG. 1, a waveform of the current Id shown in FIG. 2B repeats at the period 3*Tsw. That is, the second switching elements S1 and S2 of the multiple (two) snubber circuits N1 and N2 are turned on sequentially in response to the turn-on of the switching element SW1. Then, the frequencies f1, f2, and f3 of the ringing superimposed on the turn-on of the main switching element SW1 are also switched sequentially to disperse a resonance peak of the ringing.

Figure 3:
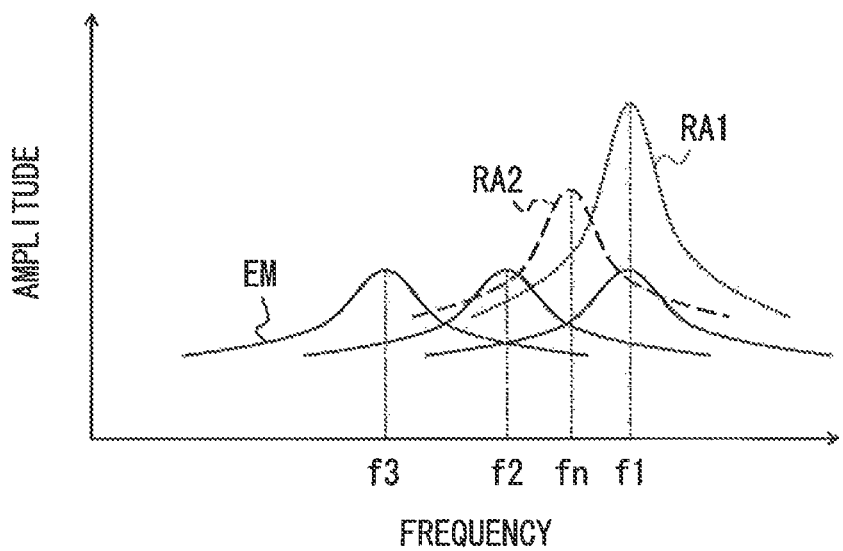
FIG. 3 is a diagram showing noise spectrums of the power conversion apparatus shown in FIG. 1, a conventional power conversion apparatus shown in FIG. 17A, and a conventional power conversion apparatus shown in FIG. 18A.

FIG. 3 is diagram showing noise spectrums of the current Id to schematically showing the relationship between frequencies and amplitudes, in which the ringing (circuit resonance) of the current Id shown in FIG. 2B is treated with Fourier-transformation in the above power conversion apparatus 100. In FIG. 3, a line EM shows a noise spectrum of the power conversion apparatus 100 shown in FIG. 2, a line RA1 shows a noise spectrum of the conventional power conversion apparatus 90 shown in FIG. 19, and a line RA2 shows a noise spectrum of the conventional power conversion apparatus 91 shown in FIG. 19.

As shown in FIG. 3, as compared with the power conversion apparatus 90 (RA1) having no RC snubber N, the conventional power conversion apparatus 91 (RA2) having the RC snubber N suppresses a peak value by shifting one resonance peak to lower frequencies. On the other hand, in the above power conversion apparatus 100 (EM), by dispersing the resonance peak to multiple peaks to further reduce a peak value of each resonance peak, a noise level due to the ringing (circuit resonance) can be suppressed over the frequencies. Hereinafter, the above multiple snubber circuits in the power conversion apparatus of the present disclosure are also called distribution snubber circuits.

Noise reduction by the RC snubber N of the conventional power conversion apparatus 91 is due to loss characteristics in the resistor R and capacitor C. The loss characteristics bring resonance amplitude reduction and convergence time reduction (overdamping) of the ringing. Therefore, in the conventional power conversion apparatus 91 having the RC snubber N, introduction of the resistor R and capacitor C may cause loss of the current Id. On the other hand, in the power conversion apparatus 100 of FIG. 1, a resonance frequency is dispersed to some frequencies to reduce a noise peak independently of the loss characteristics of the resistors R1 and R2 and capacitors C1 and C2 in the snubber circuits N1 and N2. Accordingly, in comparison with the power conversion apparatus 91 having the conventional RC snubber N in which a resonance frequency is not dispersed, the power conversion apparatus 100 of FIG. 1 is capable of reducing noise.

In the power conversion apparatus 100 of FIG. 1 in which a resonance peak is dispersed to multiple ones to reduce a noise level, a capacitance value of the capacitor C1 of the snubber circuit N1 and a capacitance value of the capacitor C2 of the snubber circuit N2 can be made small as described later. The snubber circuits N1 and N2 are coupled in parallel to the main circuit 1L. For example, in the power conversion apparatus 100, capacitance values of the capacitors C1 and C2 in the snubber circuits N1 and N2 may be equal to or below values of the device capacitance Cd of the main switching element SW2 and diode D2. Therefore, the snubber circuits N1 and N2 can be formed easily on a semiconductor chip and thus can be made compact.

It is preferable that resistance values of the resistors R1 and R2 in the snubber circuits N1 and N2 are 0.1 times or more and ten times or less of a characteristic impedance of the main circuits 1H and 1L including circuits coupled to the direct current power supply E and load L in consideration of suppression of a surge current and loss reduction.

As mentioned above, the power conversion apparatus 100 illustrated in FIG. 1 is a power conversion apparatus for the direct current power supply E with the switching elements SW1 and SW2 such as a power MOSFET. The power conversion apparatus 100 achieves sufficient reduction of noise associated with the ringing (circuit resonance) and size reduction even when the snubber circuits N1 and N2 are structured on the semiconductor chip.

In the period Pc in the time chart of the power conversion apparatus 100 shown in FIG. 2B, the second switching elements S1 and S2 of the two snubber circuits N1 and N2 enter the on-state simultaneously before the turn-on of the main switching element SW1. Thus, in the power conversion apparatus 100, part or all of the second switching elements may enter the on-state simultaneously before the turn-on or turn-off of the main switching element.

Accordingly, the capacitors of the snubber circuits that enter the on-state simultaneously are added, and the sum of the capacitance values is the overall capacitance value. Therefore, even when a capacitance value of each capacitor in the distribution snubber circuits is small, a large capacitance value can be provided as a whole in comparison with the case in which the simultaneous on-state is not allowed.

Figure 4:
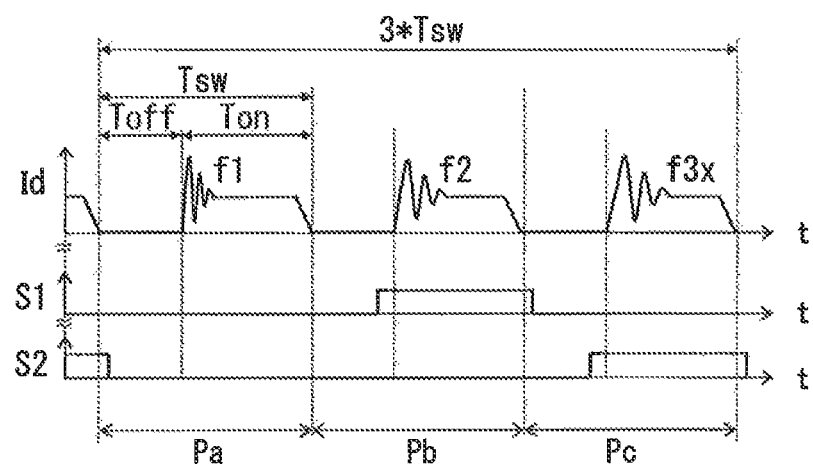
FIG. 4 is a time chart in which snubber circuits N1 and N2 are operated separately by use of the circuit configuration of the power conversion apparatus shown in FIG. 2A so that second switching elements S1 and S2 do not enter an on-state simultaneously.

On the other hand, FIG. 4 is a time chart in which the capacitors C1 and C2 in the circuitry of the power conversion apparatus 100 shown in FIG. 2A have different capacitance values, and in which the snubber circuits N1 and N2 are operated separately such that the second switching elements S1 and S2 does not enter the on-state simultaneously.

In the time chart shown in FIG. 4, operation states of the second switching elements S1 and S2 in the period Pa and period Pb before the turn-on of the main switching element SW1 are the same as in the time chart of FIG. 2B using the same circuitry as in FIG. 4. On the other hand, in the period Pc in the time chart of FIG. 4, only the second switching element S2 enters the on-state before the turn-on of the main switching element SW1. Therefore, in this case, only the snubber circuit N2 functions, and a frequency f3x of a circuit resonance in the period Pc of FIG. 4 is expressed with Expression 4.

$$f_{3x} = \frac{1}{2\pi}\sqrt{\frac{1}{L_p \times (C_d + C_2)}}$$ [Expression 4]

The circuit resonance frequency f3x in the period Pc in the time chart of FIG. 4 is higher than the circuit resonance frequency f3 in the period Pc in the time chart of FIG. 2B. Then, a shift amount from the circuit resonance frequency f1 in the period Pa is smaller than that in the time chart of FIG. 2B. A resonance peak of ringing (noise) is dispersed to three frequency components to reduce the resonance peak also in the time chart of FIG. 4.

In both the time charts of FIG. 2B and FIG. 4, the second switching elements S1 and S2 are in the off-state in the period Pa, and the parasitic device capacitance Cd is used as one circuit resonance frequency f1 dispersed. However, multiple dispersed circuit resonance frequencies may be structured only by the capacitors of the distribution snubber circuits added to the main circuit. For example, in the time chart of FIG. 2B, the period Pa may be omitted, and only the periods Pb and Pc may be repeated. In this case, the circuit resonance frequency is dispersed to f2 and f3. By increasing the number of the snubber circuits coupled in parallel to the main circuit to increase the number of dispersed circuit resonance frequencies, better noise reduction can be obtained.

Better noise reduction by dispersion of a circuit resonance frequency can be obtained as the number of the multiple snubber circuits coupled in parallel to the main circuit is increased to increase the number of dispersed resonance peaks. However, for example, one snubber circuit is coupled in parallel to the main circuit, the second switching element of this snubber circuit enters the on-state every one cycle with respect to the main switching element that repeats on-off. Then, the resonance peak is dispersed to two by the capacitor of the snubber circuit and the parasitic device capacitance Cd. Accordingly, noise reduction can be obtained by the dispersion of the circuit resonance frequency.

Next, as shown in FIG. 1, in the power conversion apparatus 100, a second resistor Rp1 may be coupled in parallel between both ends of the second switching element S1 and a second resistor Rp2 may be coupled in parallel between both ends of the second switching element S2. This is not directly related to the dispersion of the circuit resonance frequency. The capacitor C1 forming the snubber circuit N1 and the capacitor C2 forming the snubber circuit N2 can enter a discharging state due to the second resistors Rp1 and Rp2. Accordingly, at the turn-on of the second switching elements S1 and S2, the ringing (circuit resonance) due to charges of the capacitors C1 and C2 can be prevented.

It is preferable that a resistance value of the second resistors Rp1 and Rp2 are ten times or more of a resistance value of the resistors R1 and R2.

Next, modification of the power conversion apparatus 100 shown in FIG. 1 is explained.

Figure 5A:
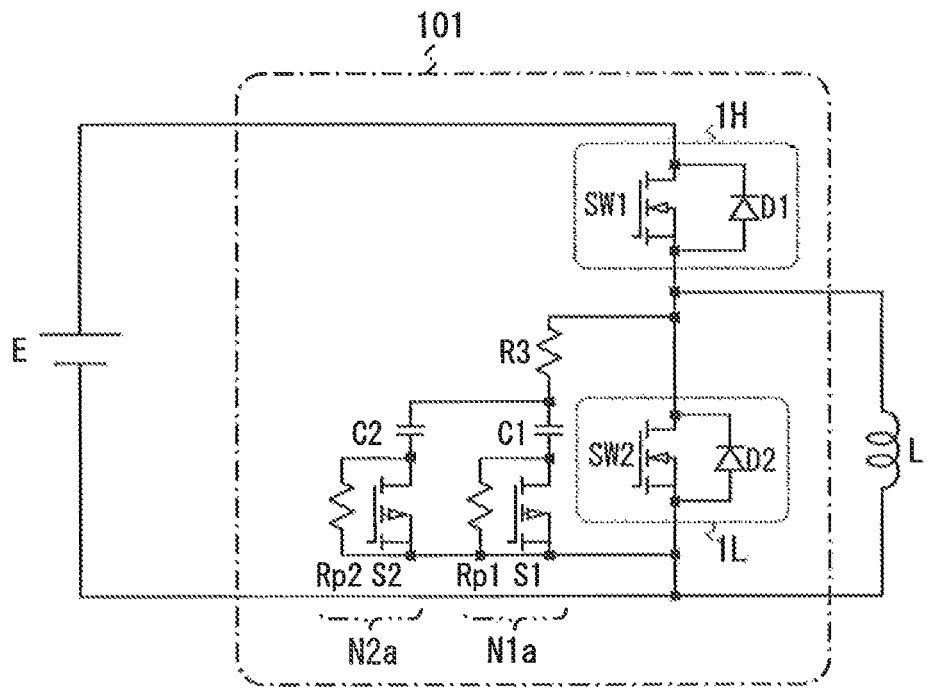
FIG. 5A is a circuit diagram showing another example of the power conversion apparatus.
Figure 5B:
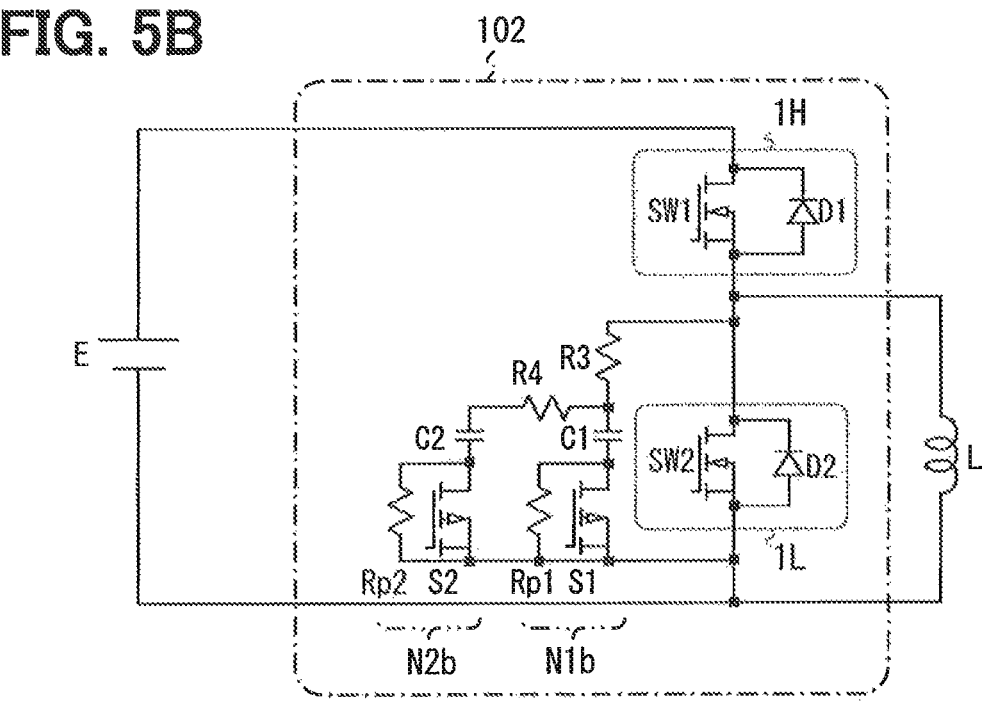
FIG. 5B is a circuit diagram showing another example of the power conversion apparatus.

In a power conversion apparatus 101 shown in FIG. 5A and a power conversion apparatus 102 shown in FIG. 5B, part or all of resistors are shared by distribution snubber circuits coupled in parallel to the main circuit 1L.

In the power conversion apparatus 101 of FIG. 5A, all the resistors are shared by multiple (two) snubber circuits N1a and N2a coupled in parallel to the main circuit 1L. In other words, each of the snubber circuits N1a and N2a coupled in parallel to the main circuit 1L has a resistor R3.

On the other hand, in the power conversion apparatus 102 of FIG. 5B, part of the resistors are shared by the multiple (two) snubber circuits N1b and N2b coupled in parallel to the main circuit 1L. That is, the snubber circuit N1b and N2b share the resistor R3, the snubber circuit N1b has the resistor R3, and the snubber circuit N2b has the resistors (R3+R4). In a different view, the snubber circuits N1b and N2b in the power conversion apparatus 102 are provided with the resistor R4 between the capacitors C1 and C2 with respect to the snubber circuits N1a and N2a of FIG. 5A.

In the structure of the snubber circuits N1a and N2a in power conversion apparatus 101 of FIG. 5A, since the capacitors C1 and C2 are coupled in parallel when the second switching elements S1 and S2 are both in the on-state, a new circuit resonance may occur accordingly. In the structure of the snubber circuits N1b and N2b in the power conversion apparatus 102 of FIG. 5B, the resistor R4 is provided between the capacitors C1 and C2 to suppress the noise generated by the above circuit resonance.

As shown in the power conversion apparatus 101 of FIG. 5A and the power conversion apparatus 102 of FIG. 5B, part or all of the resistors in the distribution snubber circuits coupled in parallel to the main circuit 1L are shared to reduce components of the resistors.

Figure 6:
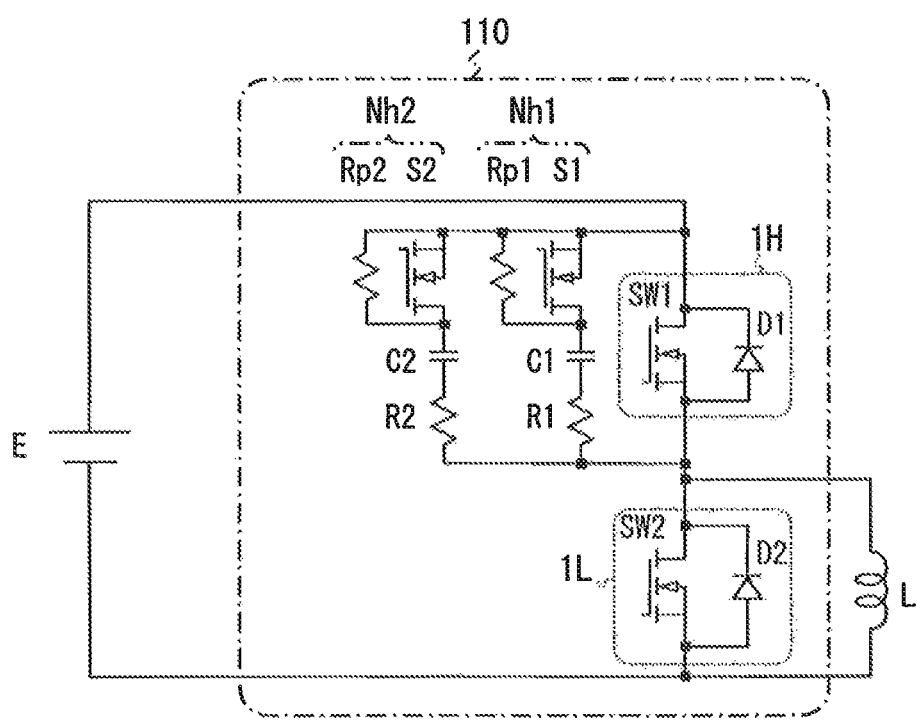
FIG. 6 is a circuit diagram showing another example of the power conversion apparatus.
Figure 7A:
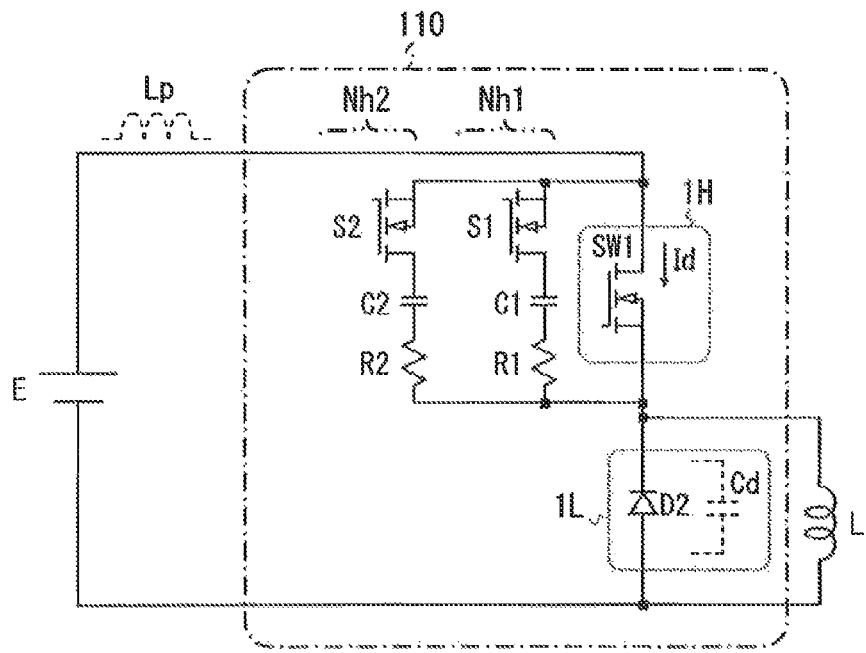
FIG. 7A is a circuit diagram to explain basic operation of the power conversion apparatus shown in FIG. 6.
Figure 7B:
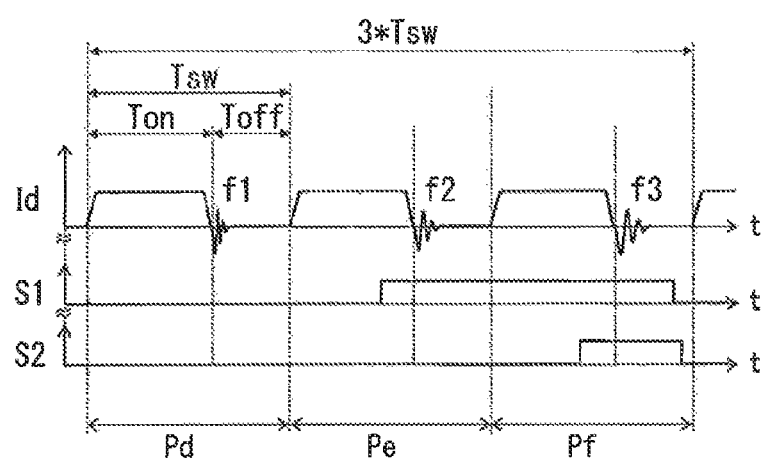
FIG. 7B is a time chart for three cycles of a main switching element in the power conversion apparatus of FIG. 7A.

FIG. 6 is a circuit diagram showing the power conversion apparatus 110 in another example. FIG. 7A is a circuit diagram to explain basic operation of the power conversion apparatus 110. FIG. 7B is a time chart for three cycles (period 3*Tsw) of the main switching element SW1 that repeats the on-off state at the period Tsw in the power conversion apparatus 110 of FIG. 7A. This time chart shows the current Id flowing through the main switching element SW1 on the high side and timings of on-off of the second switching element S1 in a snubber circuit Nh1 and second switching element S2 in a snubber circuit Nh2 in the period Pd, period Pe, and period Pf.

In the power conversion apparatus 100 of FIG. 1, the snubber circuits N1 and N2 respectively having the serially coupled resistor R1, capacitor C1, and switching element S1 and the serially coupled resistor R2, capacitor C2, and switching element S2 are coupled in parallel to the main circuit 1L on the low side. On the other hand, in the power conversion apparatus 110 shown in FIG. 6, the snubber circuits Nh1 and Nh2 respectively having the same resistors R1 and R2, capacitors C1 and C2, and second switching elements S1 and S2, which are serially coupled respectively, are coupled in parallel to the main circuit 1H on the high side.

In the snubber circuits N1 and N2 coupled in parallel to the main circuit 1L on the low side in the power conversion apparatus 100 of FIG. 1, the ringing due to the circuit resonance at the time of the turn-on of the main switching element SW1 on the high side is dispersed to three resonance frequencies f1, f2, and f3 and thus suppressed, as explained in FIG. 2A and FIG. 2B. On the other hand, in the snubber circuits Nh1 and Nh2 coupled in parallel to the main circuit 1H on the high side in the power conversion apparatus 110 of FIG. 6, the ringing due to the circuit resonance at the time of the turn-off of the main switching element SW1 on the high side is dispersed to three resonance frequencies f1, f2, and f3 and thus suppressed, as shown in FIG. 7A and FIG. 7B. The principle for suppression of ringing of the snubber circuits Nh1 and Nh2 in the power conversion apparatus 110 of FIG. 6 is the same as that of the snubber circuits N1 and N2 in the power conversion apparatus 100 of FIG. 1, and thus not explained.

The snubber circuits Nh1 and Nh2 coupled in parallel to the main circuit 1H on the high side in the power conversion apparatus 110 of FIG. 6 can be used not only for the ringing suppression at the turn-off of the main switching element SW1 on the high side but also for the ringing suppression at the turn-on of the main switching element SW2 on the low side. In this case, the diode D1 in the main circuit 1H on the high side functions as a freewheeling diode. The snubber circuits N1 and N2 coupled in parallel to the main circuit 1L on the low side in the power conversion apparatus 100 of FIG. 1 can be also used not only for the ringing suppression at the turn-on of the main switching element SW1 on the high side but also for the ringing suppression at the turn-off of the main switching element SW2 on the low side.

Figure 8A:
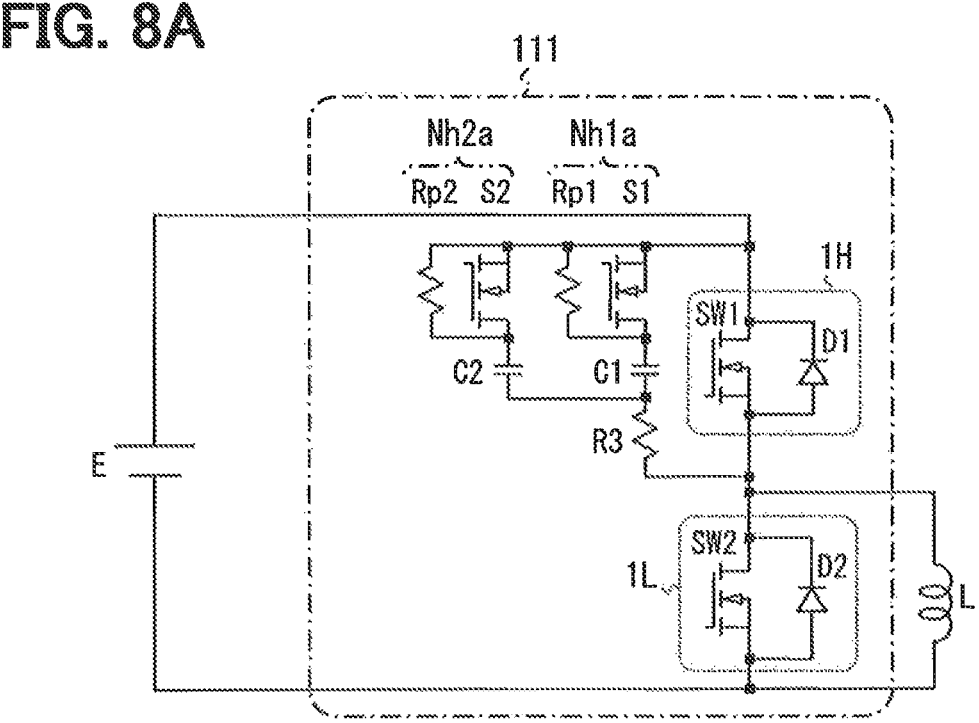
FIG. 8A is a circuit diagram showing another example of the power conversion apparatus.
Figure 8B:
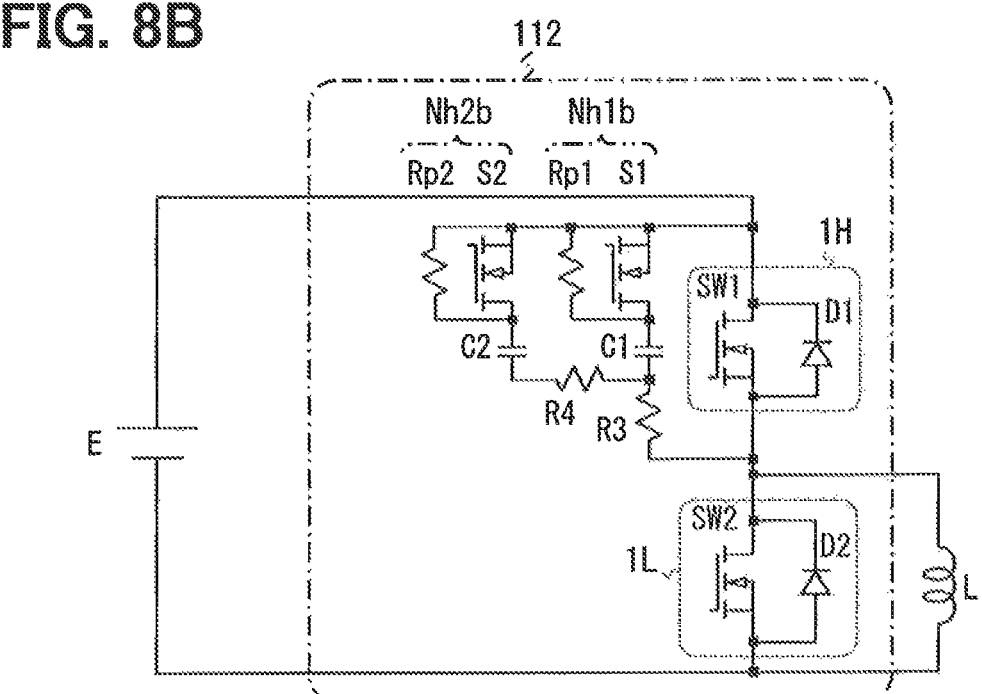
FIG. 8B is a circuit diagram showing another example of the power conversion apparatus.

In a power conversion apparatus 111 shown in FIG. 8A and a power conversion apparatus 112 shown in FIG. 8B, part or all of resistors are shared in distribution snubber circuits coupled in parallel to the main circuit 1H. That is, the power conversion apparatus 111 of FIG. 8A, all the resistors are shared in multiple (two) snubber circuits Nh1a and Nh2a coupled in parallel to the main circuit 1H. The snubber circuits Nh1a and Nh2a share the resistor R3. On the other hand, in the power conversion apparatus 112 of FIG. 8B, part of the resistors are shared in multiple (two) snubber circuits Nh1b and Nh2b coupled in parallel to the main circuit 1H. The snubber circuits Nh1b and Nh2b share the resistor R3. The snubber circuit Nh1b has the resistor R3. The snubber circuit Nh2b has the resistors (R3+R4). In the structure of the snubber circuits Nh1b and Nh2b in the power conversion apparatus 112 of FIG. 8B, as well as in the snubber circuits N1b and N2b in the power conversion apparatus 102 of FIG. 5B, the resistor R4 is provided between the capacitors C1 and C2 to suppress noise of a new circuit resonance due to the parallel connection of the capacitors C1 and C2.

As mentioned above, FIG. 1 to FIG. 8B show the examples of the power conversion apparatuses in which the distribution snubber circuits are coupled in parallel to any one of the two main circuits, 1H on the high side and 1L on the low side.

Figure 9:
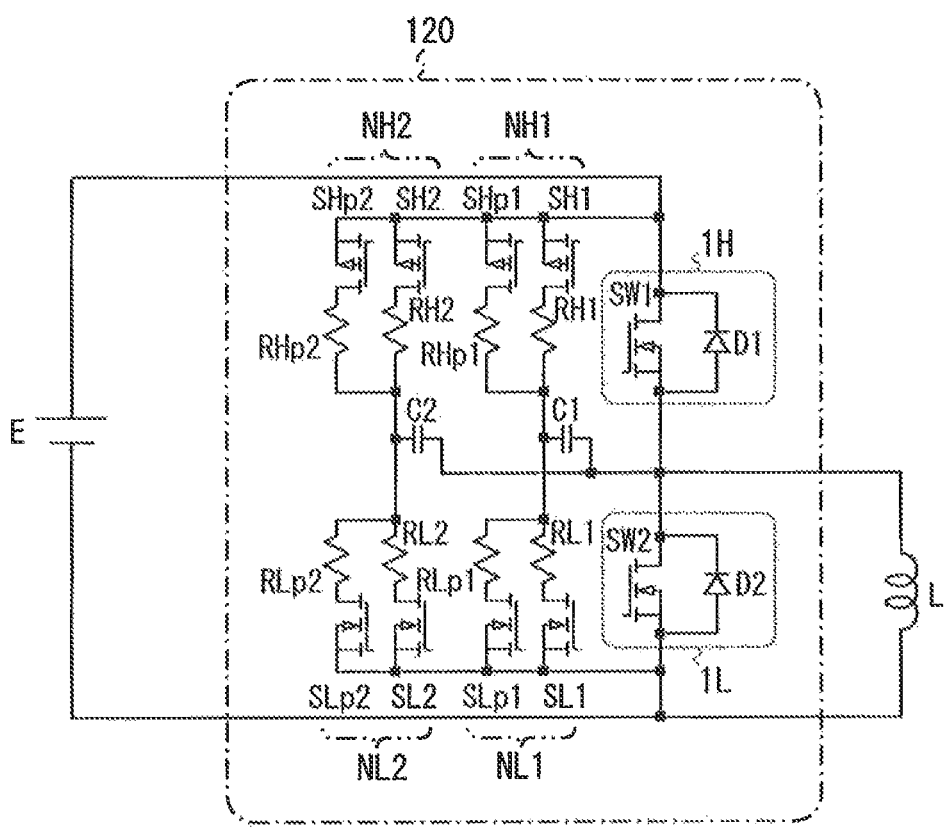
FIG. 9 is a circuit diagram showing another example of the power conversion apparatus.

A power conversion apparatus 120 shown in FIG. 9 is an example of a power conversion apparatus in which distribution snubber circuits are coupled in parallel to both the two main circuits, 1H on the high side and 1L on the low side. That is, in the power conversion apparatus 120 of FIG. 9, a snubber circuit NH1 having a resistor RH1, the capacitor C1, and a second switching element SH1 and a snubber circuit NH2 having a resistor RH2, the capacitor C2, and a second switching element SH2 are coupled in parallel to the main circuit 1H on the high side. The resistor RH1, capacitor C1, and second switching element SH1 are serially coupled. The resistor RH2, capacitor C2, and second switching element SH2 are serially coupled. A snubber circuit NL1 having a resistor RL1, the capacitor C1, and a second switching element SL1 and a snubber circuit NL2 having a resistor RL2, the capacitor C2, and a second switching element SL2 are coupled in parallel to the main circuit 1L on the low side. The resistor RL1, capacitor C1, and second switching element SL1 are serially coupled. The resistor RL2, capacitor C2, and second switching element SL2 are serially coupled. The configuration of the above power conversion apparatus 120 is as follows. In the snubber circuits NH1 and NL1 and the snubber circuits NH2, NL2 on the high side and the low side coupled in parallel to both the main circuits 1H and 1L, the capacitor C1 and the capacitor C2 are respectively shared.

In the power conversion apparatus 120 of FIG. 9, the main switching element SW1 in the main circuit 1H on the high side and the main switching element SW2 in the main circuit 1L on the low side operate complementarily and independently before and after a dead time. That is, when one of the main switching elements is in the on-state, the other main switching element is in the off-state. Therefore, when the distribution snubber circuits are coupled in parallel to both two main circuits 1H and 1L, the snubber circuits NH1, NL1 and the snubber circuits NH2, NL2 on the high side and the low side can respectively share the capacitors C1, C2. The capacitors C1, C2 can be switchably used between the snubber circuits NH1 and NL1 and between NH2 and NL2 on the high side and the low side. Therefore, the number of the capacitors can be reduced to achieve size reduction, and usage rates of the capacitors C1, C2 can also be increased.

Figure 10A:
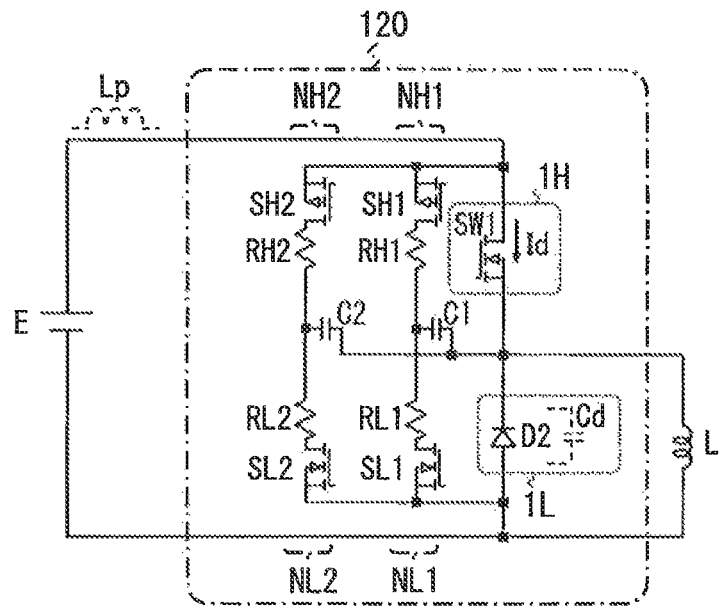
FIG. 10A is a circuit diagram to explain basic operation of the power conversion apparatus shown in FIG. 9.
Figure 10B:
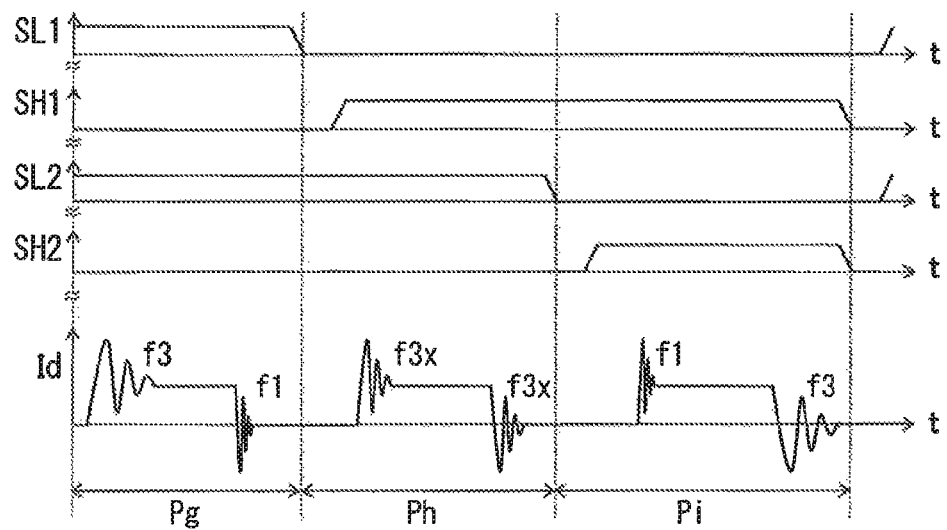
FIG. 10B is a time chart for three cycles of a main switching element in the power conversion apparatus of FIG. 10A.

FIG. 10A is a circuit diagram to explain basic operation of the power conversion apparatus 120. FIG. 10B is a time chart for 3 cycles (period Pg to period Pi) of the main switching element SW1 that repeats the on-off state at the period Tsw in the power conversion apparatus 100 of FIG. 10A. Specifically, FIG. 10B shows the current Id flowing through the main switching element SW1 on the high side and timings of on-off of the switching element SL1 of the snubber circuit NL1 on the low side, the switching element SL2 of the snubber circuit NL2 on the low side, the switching element SH1 of the snubber circuit NH1 on the high side, and the switching element SH2 of the snubber circuit NH2 on the high side. FIG. 10B shows the operation in which the main switching element SW1 in the main circuit 1H on the high side repeats the on-off state and the diode D2 in the main circuit 1L on the low side functions as a freewheeling diode.

In FIG. 10B, in the time charts of the second switching elements SL1, SL2 in the snubber circuits NL1, NL2 on the low side, the two second switching elements SL1 and SL2 are both in the on-state in the period Pg, in which a ringing resonance frequency of the current Id at the turn-on of the main switching element SW1 is f3 of Expression 3 explained above. In a period Ph, only the second switching element SL2 is in the on-state, in which a ringing resonance frequency of the current Id at the turn-on of the main switching element SW1 is f3x of Expression 4 explained above. In the period Pi, the two second switching elements SL1 and SL2 are both in the off-state, in which a ringing resonance frequency of the current Id at the turn-on of the main switching element SW1 is f1 of Expression 1 explained above. Accordingly, as mentioned above, the ringing due to the circuit resonance when the main switching element SW1 on the high side is turned on can be dispersed to three resonance frequencies f3, f3x, and f1, and thus suppressed.

On the other hand, the second switching elements SH1, SH2 of the snubber circuits NH1, NH2 on the high side are set to operate complementarily to and independently of the second switching elements SL1, SL2 of the snubber circuits NL1, NL2 on the low side, as shown in the time chart of FIG. 10B. In the period Pg, the two second switching elements SH1 and SH2 are both in the off-state, in which a ringing resonance frequency of the current Id at the turn-off of the main switching element SW1 is f1 of Expression 1 explained above. In the period Ph, only the second switching element SH2 is in the on-state, in which a ringing resonance frequency of the current Id at the turn-off of the main switching element SW1 is f3x of Expression 4 explained above. In the period Pi, the two second switching elements SH1 and SH2 are both in the on-state, in which a ringing resonance frequency of the current Id at the turn-off of the main switching element SW1 is f3 of Expression 3 explained above. Accordingly, as mentioned above, the ringing by the circuit resonance when the main switching element SW1 on the high side is turned off can be dispersed to the resonance frequencies f1, f3x, and f3, and thus suppressed.

In the power conversion apparatus 120 of FIG. 9, the snubber circuits NH1, NH2 and the snubber circuits NL1, NL2 coupled in parallel to the main circuits 1H, 1L on the high side and the low side are applicable in the same manner as above even when the main switching element SW2 in the main circuit 1L on the low side repeats the on-off state and the diode D1 in the main circuit 1H on the high side functions as a freewheeling diode.

As shown in FIG. 9, in the power conversion apparatus 120 in which the capacitors C1 and C2 are shared, serially coupled second resistors RHp1, RHp2, RPl1, RLp2 and third switching elements SHp1, SHp2, SLp1, SLp2 are coupled in parallel between both ends of the serially coupled resistors RH1, RH2, RL1, RL2 and the second switching elements SH1, SH2, SL1, SL2.

In the above structure, the third switching elements SHp1, SHp2, SLp1, and SLp2 are respectively turned on before the second switching elements SH1, SH2, SL1, SL2 on the high side and the low side are turned on. Accordingly, the second resistors RHp1, RHp2, RLp1, RLp2 can be respectively coupled in parallel to the second switching elements SH1, SH2, SL1, SL2. Thus, by setting the above shared capacitors C1, C2 in the discharging state, and turning on the third switching elements before the second switching elements SH1, SH2, SL1, SL2 are turned on, when the second switching elements SH1, SH2, SL1, SL2 are turned on, the ringing (circuit resonance) due to charges of the capacitors C1, C2 can be prevented.

Figure 11A:
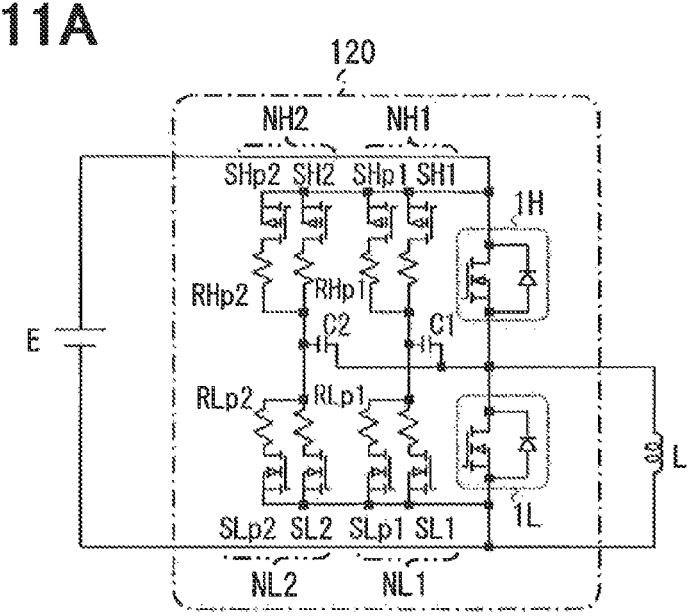
FIG. 11A is a circuit diagram to explain operation of the power conversion apparatus shown in FIG. 9.
Figure 11B:
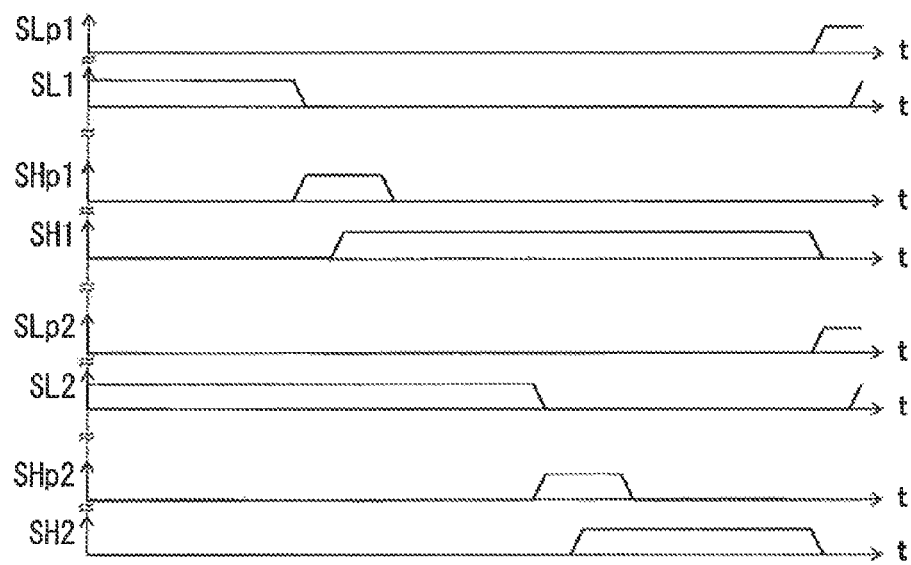
FIG. 11B is a time chart of second switching elements SH1, SH2, SL1, and SL2 and third switching elements SHp1, SHp2, SLp1, and SLp2.

FIG. 11A and FIG. 11B are diagrams to explain operations of the above second switching elements SH1, SH2, SL1, SL2 and third switching elements SHp1, SHp2, SLp1, SLp2 in the power conversion apparatus 120. FIG. 11A is a circuit diagram of the same power conversion apparatus 120 as FIG. 9 in which only numerals of components required for explanation of the above operations are shown. FIG. 11B is a time chart of the second switching elements SH1, SH2, SL1, SL2 and the third switching elements SHp1, SHp2, SLp1, SLp2.

As shown in FIG. 11B, the third switching elements SHp1, SHp2, SLp1, SLp2 are respectively turned on before the second switching elements SH1, SH2, SL1, SL2 are turned on. Thus, the capacitors C1 and C2 shared as described above enter the discharging state. Then, the ringing (circuit resonance) by the charges of the capacitors C1 and C2 can be prevented when the second switching elements SH1, SH2, SL1, SL2 are turned on.

Figure 12:
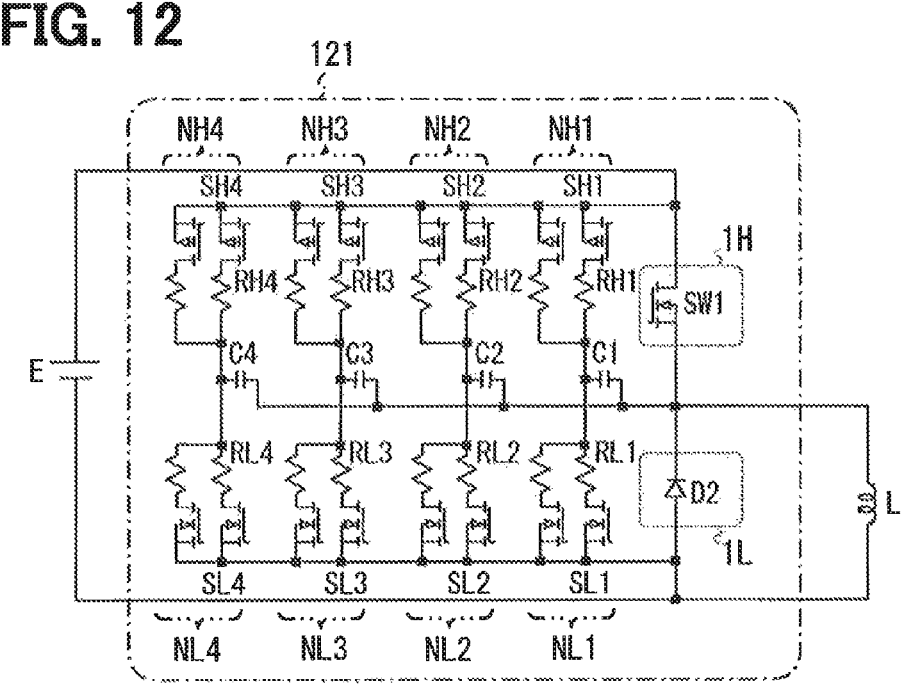
FIG. 12 is a circuit diagram showing another example of the power conversion apparatus used for circuit simulation.

FIG. 12 is a circuit diagram of another power conversion apparatus 121 used for circuit simulation.

The power conversion apparatus 121 shown in FIG. 12 has the same structure as the power conversion apparatus 120 shown in FIG. 9, in which distribution snubber circuits that share the capacitor are coupled in parallel to both the main circuits 1H, 1L on the high side and the low side. In the power conversion apparatus 120 of FIG. 9, the two snubber circuits NH1 and NH2 are coupled in parallel to the main circuit 1H on the high side, and the two snubber circuits NL1 and NL2 are coupled in parallel to the main circuit 1L on the low side. On the other hand, in the power conversion apparatus 121 of FIG. 12, four snubber circuits NH1 to NH4 are coupled in parallel to the main circuit 1H on the high side, and four snubber circuits NL1 to NL4 are coupled in parallel to the main circuit 1L on the low side.

That is, in the power conversion apparatus 121 of FIG. 12, the snubber circuits NH1 to NH4 respectively including the resistors RH1 to RH4, the capacitors C1 to C4, and the second switching elements SH1 to SH4, which are serially coupled, are coupled in parallel to the main circuit 1H on the high side. The snubber circuits NL1 to NL4 respectively including the resistors RL1 to RL4, the capacitors C1 to C4, and the second switching elements SL1 to SL4, which are serially coupled, are coupled in parallel to the main circuit 1L on the low side. In the configuration of the power conversion apparatus 121, the capacitor C1 to the capacitor C4 are shared by the snubber circuits NH1, NL1 to the snubber circuits NH4, NL4 on the high side and the low side coupled in parallel to both of the main circuits 1H, 1L.

Figure 13:
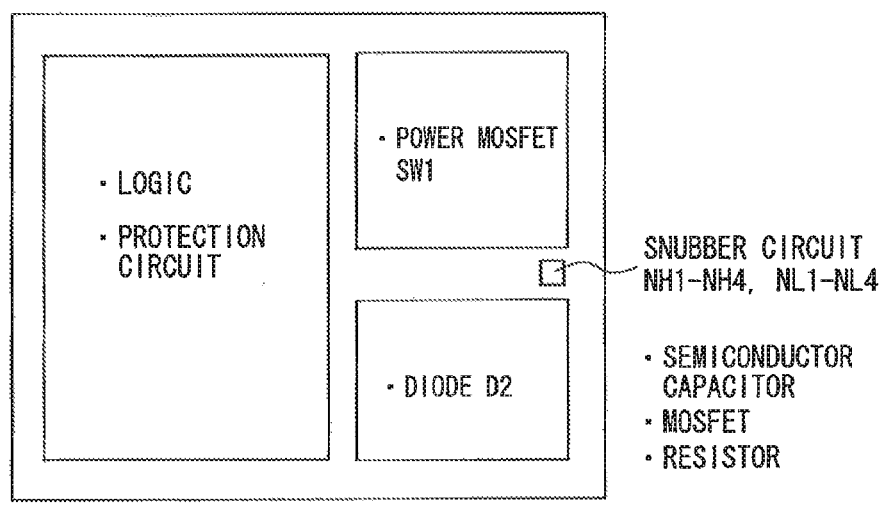
FIG. 13 is a diagram showing an example of a layout of components of the power conversion apparatus shown in FIG. 12.

FIG. 13 shows an example of a layout of components of the power conversion apparatus 121 of FIG. 12.

In FIG. 13, in the circuit of the power conversion apparatus 121 that can supply current about several ten A to the load L, a device capacitance of the main switching element SW1 on the high side is 450 pF, and a device capacitance of the diode D2 on the low side is 300 pF. Greater noise reduction can be acquired as capacitance values of the capacitors C1 to C4 shared by the snubber circuits NH1 to NH4, NL1 to NL4 that disperse a resonance peak of ringing (noise) are larger. However, to acquire the large capacitance values, a large device area may be needed. Therefore, in FIG. 13, assuming that an occupation area of about 1/10 of the diode D2, the area being considered to be a tolerance in actual design, is assigned as an area of the capacitors C1 to C4, a capacitance value of the capacitors C1 to C4 is 100 pF. The elements other than the resistors and MOSFETs (the second switching elements and third switching elements) forming the snubber circuits NH1 to NH4 and NL1 to NL4 can be structured on a smaller area than that of the capacitors C1 to C4.

Next, timings of switching of the second switching elements SH1 to SH4 and SL1 to SL4 in the power conversion apparatus 121 of FIG. 12 used for the circuit simulation are explained.

The timings of switching of the second switching elements SH1 to SH4 and SL1 to SL4 are as follows before on-off operation of the main switching element SW1.

In the initial state, the second switching elements SL1 to SL4 on the low side are all in the on-state, and the second switching elements SH1 to SH4 on the high side are all in the off-state. When the main switching element SW1 completes the on-off operation once, the second switching element SL1 on the low side is turned ff and the second switching element SH1 on the high side is turned on during the dead time. Then, when the main switching element SW1 completes the next on-off operation, the second switching element SL2 on the low side is turned off and the second switching element SH2 on the high side is turned on. When a series of the above operations are executed until the second switching element SL4 on the low side is turned off and the second switching element SH4 on the high side is turned ON, all the second switching elements SL1 to SL4 on the low side enter the on-state, and all the second switching elements SH1 to SH4 on the high side enter the off-state. Next, when the main switching element SW1 carries out the on-off operation, the initial state returns, all the second switching elements SL1 to SL4 on the low side enter the on-state, and all the second switching elements SH1 to SH4 on the high side enter the off-state.

By repeating the above operations, the ringing frequency is dispersed to four and the noise is reduced by this dispersion.

In the dispersion of the resonance peak by the above operations, the frequency f1 of the circuit resonance due to the parasitic inductance Lp and device capacitance Cd shown by Expression 1 is not used as a dispersion element.

Figure 14:
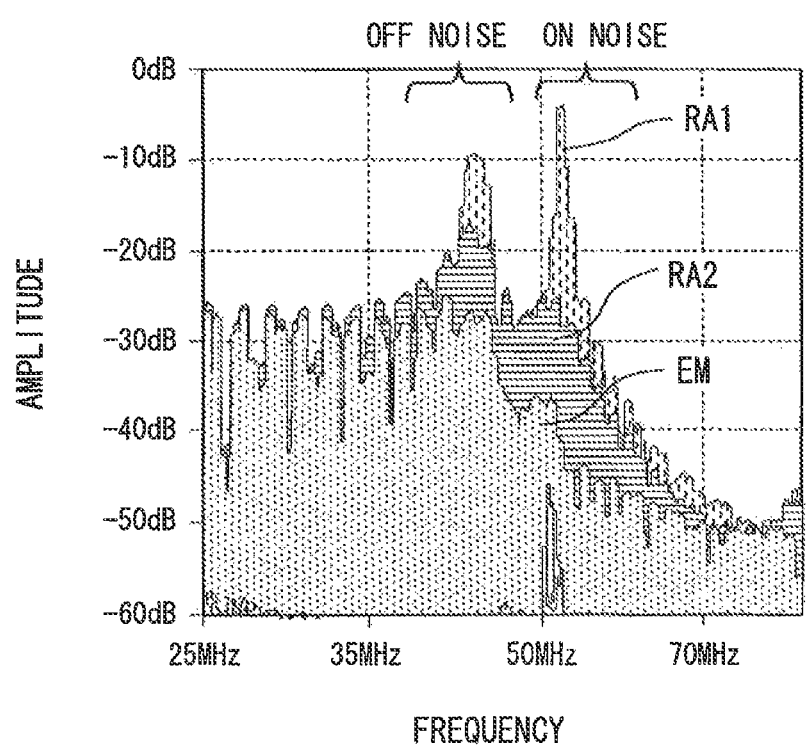
FIG. 14 shows a result obtained by executing circuit simulation of the power conversion apparatus shown in FIG. 12 and a conventional power conversion apparatus and by performing Fourier-transformation of the current which flows out of the direct current power supply.

FIG. 14 is a summary diagram showing the result obtained by Fourier-transforming (FFT) the current Id flowing from the direct current power supply E after the circuit simulation by the above operations is executed in the power conversion apparatus 121 of FIG. 12. In FIG. 14, EM1 shows a simulation result of the power conversion apparatus 121 of FIG. 12. RA1 shows a simulation result when an RC snubber, for example, in the power conversion apparatus 90 shown in FIG. 17A is not used, and RA2 shows a simulation result when a conventional RC snubber (capacitors on the high side and low side are each 50 pF) without frequency dispersion, for example, in the power conversion apparatus 91 shown in FIG. 18 is used.

As shown in FIG. 14, the power conversion apparatus 121 that disperses a ringing frequency to four can reduce both on-noise and off-noise lower than a power conversion apparatus having no RC snubber and a power conversion apparatus having a conventional RC snubber without frequency dispersion, and thus achieves better noise reduction.

The power conversion apparatus of an embodiment of the present disclosure illustrated above may be a DC-DC converter, for example.

The power conversion apparatus of an embodiment of the present disclosure may be also an inverter that changes direct current power to ac power. In this case, the distribution snubber circuits are coupled in parallel to both the above two main circuits. Large power drive is also possible in the above power conversion apparatus. For example, the load may be a three phase induction motor. In this case, the power conversion apparatus has three sets of serially coupled two main circuits on the high side and on the low side.

Figure 15A:
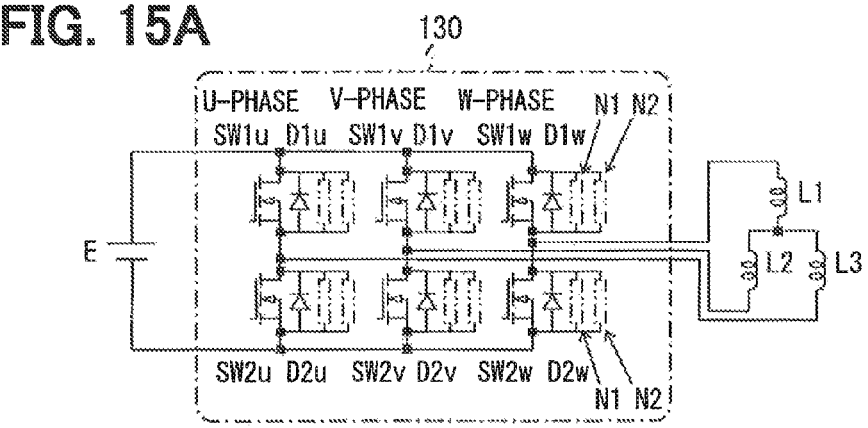
FIG. 15A is a circuit diagram showing an example of a power conversion apparatus that functions as an inverter using a three phase induction motor as a load.
Figure 15B:
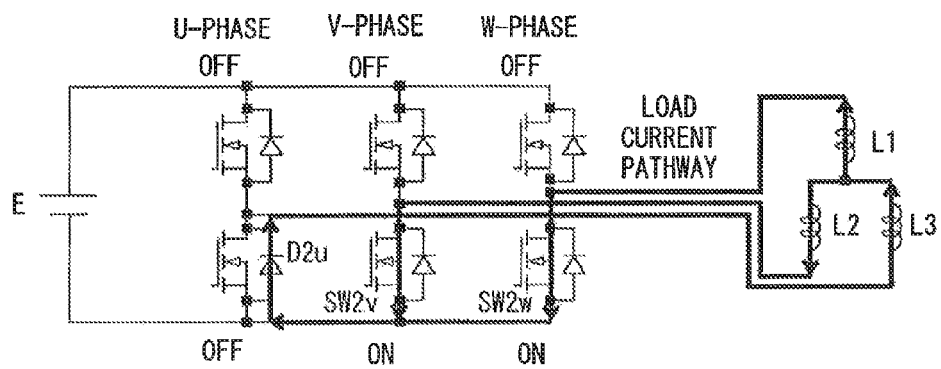
Figure 15C:
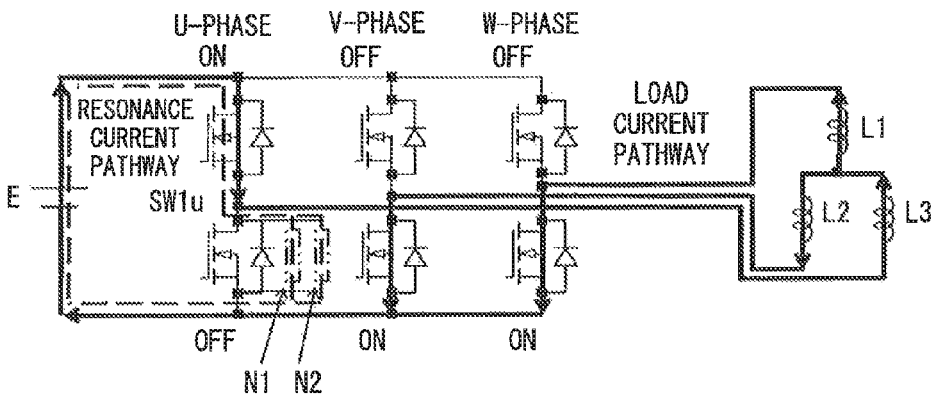

FIGS. 15A to 15C explain a power conversion apparatus which functions as an inverter having the above three-phase induction motor as a load. FIG. 15A is a circuit diagram of the power conversion apparatus 130. FIG. 15B is a diagram showing a load current path before a main switching element SW1u on the high side of U phase is turned on. FIG. 15C is a diagram showing a load current path and a resonance current path immediately after the main switching element SW1u is turned on.

As shown in FIG. 15A, a power conversion apparatus 130 is provided with three sets (U phase, V phase, and W phase) of the same serially coupled main circuits on the high side and on the low side as the power conversion apparatus 100 of FIG. 1. In the respective phases, the main circuits on the high side are provided with main switching elements SW1u, SW1v, and SW1w and diodes D1u, D1v, and D1w coupled in anti-parallel thereto, and the main circuits on the low side are provided with main switching elements SW2u, SW2v, and SW2w and diodes D2u, D2v, and D2w coupled in anti-parallel thereto. Each phase is coupled in parallel to the direct current power supply E. Electric power is supplied to the inductive loads L1, L2, and L3 that are star coupled from connection points between the main circuits on the high side and low side. The multiple sets (two) of snubber circuits N1 and N2 are coupled in parallel to the main circuits on the high side and on the low side in each phase to form distribution snubber circuits.

When the power conversion apparatus of the present disclosure, such as the power conversion apparatus 130 shown in FIG. 15A, is applied to a three-phase inverter, the operation is as follows. With respect to the main switching element that is turned on from the off-state, the distribution snubber circuits coupled to the opposite side to this main switching element in the same phase function to suppress ringing. With respect to the main switching element that is turned off from the on-state, the distribution snubber circuits coupled to the same side as this switching element in the same phase function to suppress ringing.

For example, a case in which the main switching element SW1u on the high side in the U phase is turned ON is explained.

As shown in FIG. 15B, before the main switching element SW1u is turned on, a load current flows through the diode D2u on the low side in the U phase, the main switching element SW2v on the low side in the V phase, and the main switching element SW2w on the low side in the W phase, the main switching elements SW2v and SW2w being in the on-state, as shown by a thick solid arrow in the figure. Next, as shown in FIG. 15C, immediately after the main switching element SW1u is turned on, a load current flows through the main switching element SW1u on the high side in the U phase which has been turned on and the main switching element SW2v on the low side in the V phase and the main switching element SW2w on the low side in the W phase which are in the on-state, as shown by a thick solid arrow in the figure. At this time, as shown by a dashed line in the figure, a resonance current of ringing flows through one or both of the snubber circuits N1 and N2 coupled to the low side opposite to the main switching element SW1u in the U phase. As mentioned above, each time the main switching element SW1u is turned on, a resonance frequency changes repeatedly, and thus ringing is suppressed.

In the power conversion apparatus explained above, the multiple snubber circuits are coupled to the main circuit, and the combination of on-states of the second switching elements in the multiple snubber circuits is changed one after another. Accordingly, a resonance peak of ringing is dispersed to reduce noise associated with the ringing (circuit resonance) sufficiently. In addition to the above advantages, the following advantages are available.

When the suppression of a spiked surge current and ringing associated therewith is insufficient, the spiked surge current and ringing affect devices installed around the power conversion apparatus variously as noise related to EMC. Especially, the spiked surge current and ringing greatly affect external devices coupled to the ground (GND) common to the power conversion apparatus and sharing the GND wiring with the power conversion apparatus.

Then, for example, when a different external device is coupled to the GND common to the above power conversion apparatus, a series of resonance frequencies of resonance peaks dispersed in the above power conversion apparatus are different from a circuit resonance frequency of this external device at which an abnormal operation occurs in the external device.

In the above power conversion apparatus, the multiple snubber circuits are coupled in parallel to one main circuit. The capacitors and combinations of the on-states of the second switching elements forming the multiple snubber circuits are set suitably. The series of resonance frequencies can be set to arbitrary frequencies. For this reason, even when an external device is coupled to the GND common to the above power conversion apparatus, the series of resonance frequencies can be set with selectively avoiding a circuit resonance frequency of this external device at which abnormal operation occurs in the external device. Therefore, in the above power conversion apparatus, a resonance peak of ringing is dispersed to sufficiently reduce noise associated with ringing (circuit resonance). Additionally, it is difficult for noise generated by the power conversion apparatus to affect a specific external device that is susceptible to noise.

On the other hand, in a conventional power conversion apparatus having one RC snubber provided with a resistor and capacitor which are serially coupled, noise suppression is insufficient and a noise frequency cannot be selected. In the conventional power conversion apparatus having one RC snubber, a value of a capacitor of the RC snubber may be required to change a noise frequency. However, when a value of the capacitor is increased, an area of the capacitor increases, and when a value of the capacitor is reduced, noise increases. For example, when an external device is coupled to the common GND later, and noise that matches a circuit resonance frequency at which abnormality occurs in this external device has generated in the power conversion apparatus, it is difficult to avoid the noise in the conventional power conversion apparatus having one RC snubber.

For example, the conventional power conversion apparatus 90 shown in FIG. 17A, the conventional power conversion apparatus 91 shown in FIG. 18, and the power conversion apparatus 121 of an embodiment of the present disclosure shown in FIG. 12 are explained in a specific example.

Figure 19:
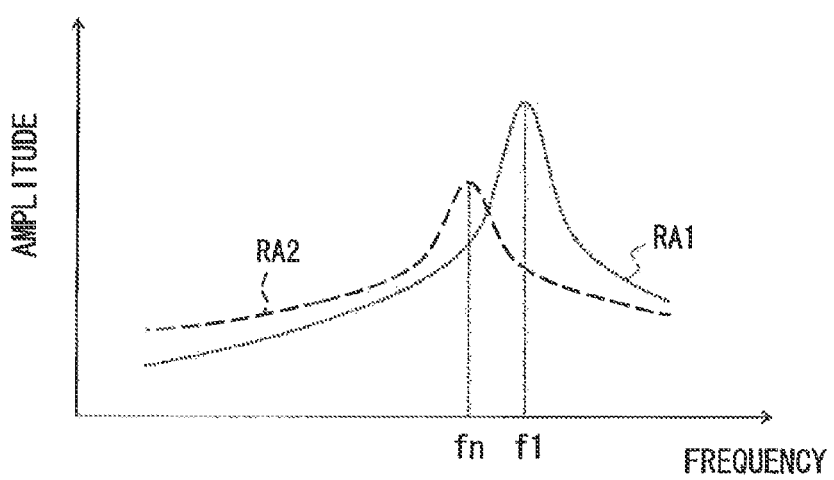
FIG. 19 is a noise spectrum of currents in the power conversion apparatus (RA1) shown in FIG. 17A and the power conversion apparatus (RA2) shown in FIG. 18.

In the conventional power conversion apparatus 90 shown in FIG. 17A, when the device capacitance Cd is 300 pF, and the parasitic inductance Lp of a wiring coupled to the direct current power supply E is 30 nH, the resonance frequency f1 of the noise peak shown in FIG. 19 is 53.1 MHz, as calculated by Expression 1. In the conventional power conversion apparatus 91 shown in FIG. 18, when a capacitance of the capacitor C of the RC snubber is 50 pF, the resonance frequency fn of the noise peak shown in FIG. 19 is 49.1 MHz, as calculated by Expression 2. Therefore, when an external device having a circuit resonance frequency of 49.1 MHz is later coupled to the GND common to the power conversion apparatus 91 shown in FIG. 18, an abnormal operation may occur easily although the noise peak is reduced lower in the power conversion apparatus 91 of FIG. 18 than in the power conversion apparatus 90 of FIG. 17A. A noise amplitude at fn=49.1 MHz is higher in the power conversion apparatus 91 than in the power conversion apparatus 90.

On the other hand, in the power conversion apparatus 121 of an embodiment of the present disclosure shown in FIG. 12, a capacitance of the capacitor C1 is 20 pF, a capacitance of the capacitor C2 is 20 pF, a capacitance of the capacitor C3 is 30 pF, and a capacitance of the capacitor C4 is 30 pF. Based on combinations of on-states of the second switching elements SL1 to SL4, parallel connection states of C1:20 pF, C1+C2=40 pF, C1+C2+C3=70 pF, and C1+C2+C3+C4=100 pF are repeated, for example. In this case, the resonance peak is dispersed to four, 51.4 MHz, 49.9 MHz, 47.8 MHz, and 46.0 MHz. When an external device having a circuit resonance frequency of 49.1 MHz is later coupled to the common GND, the following drive is possible in the power conversion apparatus 121 of FIG. 12 to avoid the circuit resonance frequency of 49.1 MHz. That is, based on combinations of on-states of the second switching elements SL1 to SL4, parallel connection states of C1:20 pF, C3=30 pF, C1+C2+C3=70 pF, and C1+C2+C3+C4=100 pF are repeated, for example. In this case, the resonance peak is dispersed to four, 51.4 MHz, 50.6 MHz, 47.8 MHz, and 46.0 MHz. Therefore, the circuit resonance frequency of 49.1 MHz of the external device can be located generally midway between two adjacent dispersed resonance frequencies 50.6 MHz and 47.8 MHz in the power conversion apparatus 121 of FIG. 12.

Thus, to selectively avoid a circuit resonance frequency of an external device coupled to the common GND, a series of resonance frequencies is preferably set to position the circuit resonance frequency of the external device to the center between any adjacent ones of the series of resonance frequencies.

Figure 16:
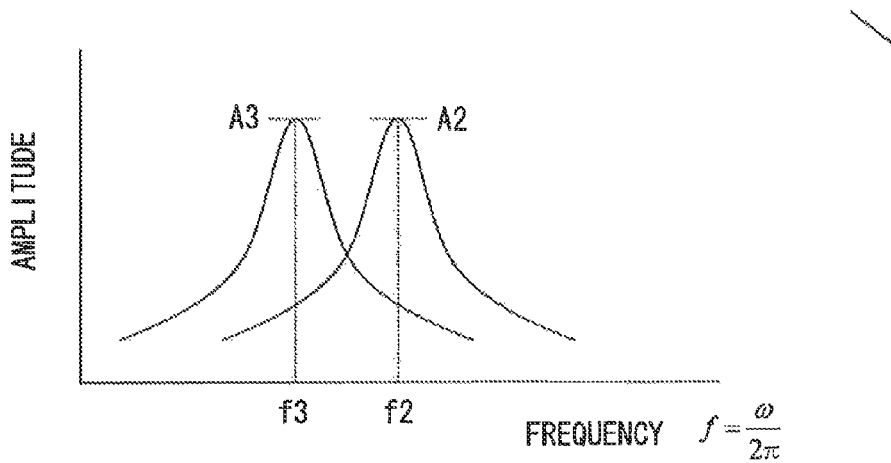
FIG. 16 is a diagram showing Formula (Expression 5) of a gap between adjacent circuit resonance frequencies f2 and f3 corresponding to states of C1 and C1+C2 and Formula (Expression 6) of an amplitude at an arbitrary position between the circuit resonance frequencies f2 and f3, in the circuit diagram of the power conversion apparatus shown in FIG. 2A.

FIG. 16 shows Formula (Expression 5) of a gap between the adjacent circuit resonance frequencies f2 and f3 corresponding to the states of C1 and of C1+C2 and Formula (Expression 6) of an amplitude at an arbitrary position between the circuit resonance frequencies f2 and f3 in the circuit diagram of the power conversion apparatus 100 shown in FIG. 2A.

As shown in FIG. 16, a noise spectrum of the above series of resonance frequencies have the generally same peak waveforms when values of the resistors R1 and R2 of the multiple snubber circuits N1 and N2 coupled are generally the same. Therefore, when a circuit resonance frequency of an external device is located in the center of adjacent resonance frequencies, the circuit resonance frequency of the external device matches a position where an amplitude in an envelope of a noise spectrum of the adjacent resonance frequencies becomes the lowest. Therefore, in comparison to the case in which the circuit resonance frequency of the external device is positioned outside the center of the adjacent resonance frequencies, it is the most difficult for the noise generated by the power conversion apparatus to affect the external device.

The above external device may be a sensor, for example.

Since the sensor has a small signal level in general, the sensor is susceptible to noise. When such a sensor susceptible to noise is coupled to the GND common to a power conversion apparatus, and the power conversion apparatus generates noise that matches a circuit resonance frequency of the sensor, output error of the sensor becomes great. For example, in measurement of immunity (tolerance) by the sensor, when noise of a constant level is applied to the GND wiring to observe output error of the sensor, an internal resonance is generated at tens to hundreds MHz to make the output error of the sensor large. Therefore, to couple such a sensor to the GND common to the power conversion apparatus, a frequency of noise generated by the power conversion apparatus is suitably changed from tens to hundreds MHz not to match a circuit resonance frequency of the sensor. It is difficult for the conventional power conversion apparatus having one RC snubber, such as the power conversion apparatus 91 shown in FIG. 18, to avoid a circuit resonance frequency of such a sensor, as described above. However, in the power conversion apparatus of an embodiment of the present disclosure, by suitably setting the capacitors forming the multiple snubber circuits and combinations of the on-states of the second switching elements forming the multiple snubber circuits, the series of resonance frequencies can be set to avoid a circuit resonance frequency of the sensor from tens to hundreds MHz. Therefore, even when the sensor susceptible to noise is coupled to the common GND later, an abnormal operation to generate a large output error of this sensor can be prevented easily.

When the above power conversion apparatus is mounted to a vehicle, an in-vehicle radio is also coupled to the common GND. In this case, when the series of resonance frequencies is set to avoid a frequency of radio broadcasting, radio noise is also effectively suppressed.

As described above, the above power conversion apparatuses of the present disclosure are all a power conversion apparatus for a direct current power supply with switching elements such as power MOSFETs. The power conversion apparatus is compact and capable of sufficiently reducing noise associated with ringing (circuit resonance) even when snubber circuits are formed on a semiconductor chip.

Therefore, the above power conversion apparatuses are used in vehicles in which electronic devices are mounted in a high density and reliable ringing suppression may be thus necessary to prevent malfunction, and are preferable when the direct power supply is a battery of a vehicle.

What is claimed is:

1. A power conversion apparatus comprising two main circuits on a high side and a low side, which are serially coupled to one another and are coupled to a direct current power supply, and supplying a power from a connection point of the two main circuits to a conductive load,
    wherein each of the two main circuits includes a main switching element and a diode coupled in anti-parallel between both ends of the main switching element,
    wherein the main switching element in one of the two main circuits is controlled to repeat an on-off state at a predetermined period, and a dead time in which the main switching elements of the two main circuits are both in an off-state is provided,
    wherein the diode in the other of the two main circuits is used as a freewheeling diode during the dead time,
    wherein a plurality of snubbers circuit each including a resistor, a capacitor, and a second switching element, which are serially coupled, is coupled in parallel to the main circuit,
    wherein the second switching elements in the plurality of snubber circuits coupled in parallel to the main circuit repeats a turn-on and a turn-off at a period of an integral multiple of the predetermined period to produce different combinations of on-states one after another before a turn-on and a turn-off of the main switching element that repeats the on-off state, and
    wherein a series of resonance frequencies of each resonance circuit formed of device capacitances of the main switching element and the diode, a parasitic inductance of a wiring coupled to the direct current power supply, and the capacitor coupled based on the combinations of the on-states of the second switching elements are different from each other.

2. The power conversion apparatus according to claim 1, wherein a part of or all of the second switching elements in the plurality of snubber circuits simultaneously enter the on-state before the turn-on or turn-off of the main switching element.

3. The power conversion apparatus according to claim 1, wherein the plurality of snubber circuits share a part of or all of the resistors.

4. The power conversion apparatus according to claim 1, wherein the resistor is a first resistor, and
    wherein each of the plurality of snubber circuits further includes a second resistor coupled in parallel between both ends of the second switching element.

5. The power conversion apparatus according to claim 1, wherein the plurality of snubber circuits are coupled in parallel to both of the two main circuits, and
    wherein the capacitor is shared by the snubber circuits coupled in parallel to both of the two main circuits.

6. The power conversion apparatus according to claim 5, wherein the resistor is the first resistor,
    wherein each of the plurality of snubber circuits further includes a second resistor and a third switching element that are serially coupled, and
    wherein the serially coupled second resistor and the third switching element are coupled in parallel between both ends of the serially coupled first resistor and second switching element.

7. The power conversion apparatus according to claim 1, wherein a capacitance value of the capacitor is equal to or less than a value of the device capacitance.

8. The power conversion apparatus according to claim 1, wherein a resistance value of the resistor is 0.1 times or more and ten times or less of a characteristic impedance of the main circuits including circuits coupled to the direct current power supply and the load.

9. The power conversion apparatus according to claim 4, wherein a resistance value of the second resistor is ten times or more of the resistance value of the first resistor.

10. The power conversion apparatus according to claim 1, wherein the diode is a soft recovery diode that performs an operation equivalent to a unipolar operation by controlling a life time of minority carriers.

11. The power conversion apparatus according to claim 1 being constituted as a DC-DC converter.

12. The power conversion apparatus according to claim 1 being constituted as an inverter that changes direct current power into alternating current power.

13. The power conversion apparatus according to claim 12, wherein the load is a three-phase induction motor, and wherein the power conversion apparatus comprises three sets of the two main circuits on the high side and the low side which are serially coupled.

14. The power conversion apparatus according to claim 1, wherein an external device is coupled to a ground common to the power conversion apparatus, and
wherein a series of resonance frequencies in the power conversion apparatus have values different from a circuit resonance frequency at which an abnormal operation is generated in the external device.

15. The power conversion apparatus according to claim 14, wherein the series of resonance frequencies are set so that a circuit resonance frequency of the external device is positioned at a center of any adjacent resonance frequencies.

16. The power conversion apparatus according to claim 14, wherein the external device includes a sensor device.

17. The power conversion apparatus according to claim 1, wherein the power conversion apparatus is configured to be disposed in a vehicle, and
wherein the direct current power supply is a battery of the vehicle.

* * * * *